United States Patent
Williames

(10) Patent No.: US 11,337,364 B2
(45) Date of Patent: May 24, 2022

(54) TO AUTOMATIC SELECTIVE TRANSPLANTERS

(71) Applicant: WILLIAMES PTY LTD, Victoria (AU)

(72) Inventor: Geoffrey Alan Williames, Warragul (AU)

(73) Assignee: WILLIAMES PTY LTD, Victoria (AU)

( * ) Notice: Subject to any disclaimer, the term of this patent is extended or adjusted under 35 U.S.C. 154(b) by 325 days.

(21) Appl. No.: 16/490,290

(22) PCT Filed: Mar. 2, 2018

(86) PCT No.: PCT/AU2018/050192
§ 371 (c)(1),
(2) Date: Aug. 30, 2019

(87) PCT Pub. No.: WO2018/157215
PCT Pub. Date: Sep. 7, 2018

(65) Prior Publication Data
US 2020/0068792 A1    Mar. 5, 2020

(30) Foreign Application Priority Data

Mar. 3, 2017  (AU) ................................ 2017900730

(51) Int. Cl.
*A01C 11/02*    (2006.01)
*A01G 9/08*    (2006.01)
(Continued)

(52) U.S. Cl.
CPC ............ *A01C 11/025* (2013.01); *A01G 9/088* (2013.01); *B65G 47/08* (2013.01); *B65G 47/90* (2013.01);
(Continued)

(58) Field of Classification Search
CPC ......... A01C 11/025; A01G 9/08; A01G 9/088
(Continued)

(56) References Cited

U.S. PATENT DOCUMENTS 4,970,972 A    11/1990  Williames
5,488,802 A *  2/1996  Williames ............... A01G 9/086
                                                    47/1.01 R
(Continued)

FOREIGN PATENT DOCUMENTS

EP         1648214 A1     4/2006
WO    WO 1990/010377    9/1990
(Continued)

OTHER PUBLICATIONS

International Search Report and Written Opinion for Application No. PCT/AU2018/050192 dated Mar. 29, 2018.
(Continued)

*Primary Examiner* — Douglas A Hess
(74) *Attorney, Agent, or Firm* — Alston & Bird LLP

(57) ABSTRACT

A selective transplanter is provided for transplanting seedlings from a tray to seedling planting apparatus. The tray includes a plurality of cells for holding plugs of growing medium containing seedlings. The transplanter is arranged to eject plugs from the cells of the tray to a conveyor which conveys the plugs to the seedling planting apparatus. The transplanter is arranged to remove plugs that do not contain germinated seedlings from the conveyor at a removal position before they are transferred to the seedling planting apparatus. A seedling retention roller engages with plant material of the seedlings projecting from the plugs at the removal position before the plugs are transferred to the seedling planting apparatus, preventing removal of plugs containing seedlings with projecting plant material. The transplanter provides the advantage that the plugs containing
(Continued)

seedlings can be planted in rows in a field without dud plugs being planted, leaving the rows substantially gap free.

23 Claims, 20 Drawing Sheets

(51) Int. Cl.
*B65G 47/08* (2006.01)
*B65G 47/90* (2006.01)

(52) U.S. Cl.
CPC ............... *B65G 2201/0202* (2013.01); *B65G 2203/0225* (2013.01); *B65G 2811/0626* (2013.01)

(58) Field of Classification Search
USPC ........................................................ 111/105
See application file for complete search history.

(56) References Cited

U.S. PATENT DOCUMENTS

| | | | |
|---|---|---|---|
| 5,676,072 A | 10/1997 | Williames | |
| 5,680,727 A * | 10/1997 | Sakaue | ................ A01G 9/0299 47/1.01 R |
| 5,765,491 A * | 6/1998 | Brower | ................ A01C 11/025 111/105 |
| 5,868,086 A | 2/1999 | Williames | |
| 5,881,655 A * | 3/1999 | Edmonds | ................ A01G 24/60 111/105 |
| 5,911,631 A | 5/1999 | Bouldin et al. | |
| 6,327,986 B1 | 12/2001 | Williames | |
| 7,404,364 B2 * | 7/2008 | Polonenko | ............. A01C 11/02 111/105 |
| 7,954,439 B2 * | 6/2011 | Faulring | .............. A01G 9/0299 111/105 |
| 8,122,838 B2 * | 2/2012 | Faulring | .............. A01G 9/0299 111/105 |
| 10,225,993 B2 * | 3/2019 | Alexander | ................ A01G 9/02 |
| 10,716,265 B2 * | 7/2020 | Alexander | ................ B25J 5/02 |
| 2015/0342112 A1 | 12/2015 | Buell et al. | |

FOREIGN PATENT DOCUMENTS

| | | |
|---|---|---|
| WO | WO-1992/03907 A1 | 3/1992 |
| WO | WO-2004/095906 A1 | 11/2004 |
| WO | WO-2005/013670 A1 | 2/2005 |
| WO | WO 2006/068518 | 6/2006 |

OTHER PUBLICATIONS

Extended European Search Report for EP Application No. 18760571.2, dated Mar. 15, 2021 (17 pages).

* cited by examiner

TO AUTOMATIC SELECTIVE TRANSPLANTERS

CROSS-REFERENCE TO RELATED APPLICATIONS

This application is a national phase entry of International Application No. PCT/AU2018/050192, filed Mar. 2, 2018, which claims priority to Australian Application No. 2017900730, filed on Mar. 3, 2017, the entire contents of which are incorporated herein by reference.

FIELD OF THE INVENTION

This invention relates to apparatus for transplanting seedlings from a tray into a ground planting position, wherein the tray includes a plurality of cells for holding plugs of growing medium containing seedlings. This type of apparatus is known as an automatic selective transplanter.

BACKGROUND

A number of semi-automatic and automatic transplanters mechanically remove plugs of growing medium containing root mass and seedlings from trays and transfer the plugs containing the seedlings to planting apparatus for planting the plugs into a field.

Some prior art transplanters have a means of selectivity by using an infrared beam sensor to detect a seedling top. This means of selectivity is inaccurate as foliage growing from the plug being detected may lie outside the detection zone, or foliage from adjoining plugs may be detected in the detection zone of a plug not containing a seedling.

Other prior art transplanters have a mechanical means of isolating and separating the seedling foliage relative to the specific plug, such means being mechanically complicated, reducing selectivity and planting speeds and being prone to reliability problems.

The global transplant industry in the main relies on a human sitting in a seat over each transplanter, and visually selecting a seedling by grasping the plant top, and physically pulling the plug and seedling from the tray and dropping the human-selected plug and seedling either directly down into the transplanter, into a rotating carousel, or into a rotating carousel of receiving cups.

As economics drives the world into automatic transplanting the human selective means is lost.

On average, about 10% of all plugs containing seeds do not germinate. This means an automatic mechanical transplanter will plant seedling and dud plugs which will cause approximately 10% loss of crop.

Subsequently, gapping up the 10% loss of the seedlings in the field using hand labour, is not economic.

It is therefore desirable to provide an improved automatic selective transplanter which alleviates at least some of the disadvantage of prior art transplanters.

SUMMARY OF THE INVENTION

According to one aspect of the invention there is provided apparatus for transplanting seedlings from a tray into a ground planting position, wherein the tray includes a plurality of cells for holding plugs of growing medium containing seedlings, the apparatus including: a plug ejection means arranged to eject plugs from the cells of the tray; a conveyor arranged to receive plugs ejected from the tray and to convey the plugs to a seedling planting apparatus; and a plug removal means arranged to remove plugs that do not contain germinated seedlings from the conveyor at a removal position before they are transferred to the seedling planting apparatus; wherein the apparatus includes seedling retention means arranged to engage with plant material of the seedlings projecting from the plugs at said removal position before the plugs are transferred to the seedling planting apparatus, thereby preventing removal of plugs containing seedlings with projecting plant material by the plug removal means.

Preferably, the seedling retention means includes a resilient surface to engage with the plant material at said removal position.

In one preferred embodiment, the seedling retention means comprises a flexible roller adapted to engage and retain seedlings on the conveyor at the removal position.

The tray including the plurality of cells for holding plugs of growing medium containing seedlings is preferably an indexed tray with a gear rack each end of the tray and an engagement means arranged to index a series of rows of plugs and seedlings vertically downward to allow full rows of plugs to be ejected onto the conveyor.

The conveyor preferably has a plurality of cell pockets for receiving plugs ejected from the tray.

In one embodiment, the conveyor is arranged to move at discrete steps of between 10 to 15 cell pockets per second.

The conveyor may include cell pocket opening means arranged to open a cell pocket partially at said removal position. In one embodiment, the cell pocket opening means is arranged to cause an angular change in the direction of movement of the conveyor at said removal position. The change in angular direction may be between 10 and 25 degrees, preferably between 15 and 20 degrees and more preferably about 17 degrees.

The conveyor may include at least one extension portion adjacent a respective cell pocket arranged to support plant material projecting from a plug containing a live seedling. In a preferred embodiment, the projecting plant material is trapped between the retention means and an extension portion at said position where the plug removal means is located. Thus, 'dud' plugs that do not contain a seedling with projecting plant material are selectively removed at said position before the 'live' plugs are transferred to the seedling planting apparatus.

After removal of the 'dud' plugs, the cell pockets of the conveyor close to retain the 'live' plugs containing seedlings with projecting plant material, and the cell pockets are advanced by movement of the conveyor to a pre-planting hold position before the plugs containing seedlings are transferred to the seedling planting apparatus.

The apparatus may also include at least one sensor to detect the presence or absence of plug with a seedling at the pre-planting hold position. The sensor may be accurately positioned to read clearly the absence or presence of a plug at the hold position prior to receiving a plant signal for transfer of the plug/seedling. The plant signal indicates the planting apparatus has travelled the required distance for planting the next seedling in the field. If a plug is present then it is almost certain that the plug contains a live seedling.

The cell pockets may be opened again at an end position of the conveyor after the pre-planting hold position to enable plugs containing seedlings to be transferred to the seedling planting apparatus. The conveyor may include an adjustable position nose roller for opening the cell pockets at said end position.

The conveyor preferably comprises a conveyor belt arranged in an endless loop.

According to another aspect of the invention, there is provided apparatus for transplanting seedlings from a tray into a ground planting position, wherein the tray includes a plurality of cells for holding plugs of soil containing seedlings, the apparatus including:

a plug ejection means arranged to eject plugs from the cells of the tray; a conveyor arranged to receive plugs ejected from the tray and to convey the plugs to a seedling planting apparatus;

a plug removal means arranged to remove plugs that do not contain seedlings from the conveyor at a plug removal position before the plugs are transferred to the seedling planting apparatus; and at least one sensor to detect the presence or absence of a plug at a pre-planting hold position after the plug removal position and before the plugs are transferred to the seedling planting apparatus. If a plug is detected at the pre-planting hold position, movement of the conveyor is halted until a plant signal is received from the seedling planting apparatus.

If a plug is not detected at the pre-planting hold position, the conveyor is advanced, preferably at a rate of between 10 to 15 cell pockets per second, until a plug is detected at the pre-planting hold position. Then, the conveyor is again halted until the next plant signal is received from the seedling planting apparatus.

The removal of 'dud' plugs at the removal position where the cell pockets are partially opened, as well as rapid incremental movement of the conveyor if a plug is not detected at the hold position, and a sensor for detecting plugs at a pre-planting hold position just before the cell pockets are opened again to transfer the plugs to the planting apparatus, as well as rapid incremental movement of the conveyor if a plug is not detected at the hold position helps to ensure that seedlings are planted into the field substantially 'gap free', without gaps between planted seedlings resulting from 'dud' plugs being planted in the field.

Substantially all dud plugs are removed prior to final selectivity and the gaps may be filled at a rate of 10-15 per second in readiness to plant the field substantially gap-free.

The plug ejection means may be mechanically operated or pneumatically operated. In one embodiment, the plug ejection means includes a plurality of push rods arranged to enter the base of the tray cells to engage the plugs and to push the plugs out of the cells into the cell pockets of the conveyor.

On average, internationally, about 10% of plugs in a tray will not contain a germinated seed or seedling and are called dud plugs. The remaining 90% of plugs containing live seedlings can be interspersed with one or more duds.

The present invention provides a means of restraining plant tops from plugs containing live seedlings in an area where a cleated conveyor has an induced angular change to open the cleats apart, partially opening the cell pocket at that position. This allows the plugs containing live seedlings at that point to be loosely retained adjacent to the seedling/plant top area of retention. A dud plug which does not contain a live seedling and which does not have plant material projecting from the plug can then be removed from the partially opened cell pocket by the plug removal means.

The plug removal means may be mechanically operated, but is preferably pneumatically operated.

In one preferred embodiment, the plug removal means includes means arranged to direct a jet of air onto each plug at said position before plugs are transferred to the seedling planting apparatus so that plugs that are not restrained by engagement of the retention means with projecting plant material are removed.

According to another aspect of the invention, there is provided apparatus for transplanting seedlings from a tray into a ground planting position, wherein the tray includes a plurality of cells for holding plugs of soil containing seedlings, the apparatus including: a plug ejection means arranged to eject plugs from the cells of the tray; a conveyor arranged to receive plugs ejected from the tray and to convey the plugs to a seedling planting apparatus; a plug removal means arranged to remove plugs that do not contain seedlings from the conveyor at a position before they are transferred to the seedling planting apparatus; wherein the plug removal means includes means arranged to direct a jet of air onto each plug at said position, and the apparatus further including retention means arranged to engage with and restrain plant material projecting from plugs at said position, so that plugs that are not restrained by the retention means are removed.

The cleated conveyor preferably moves at high speed discrete steps of from 10 to 15 cells/cleats per second. Briefly paused precisely in line with the retention means and the opened cleats at this instant air jets aligned with the open cleat pocket and the plug give a controlled pressure rise of air sufficient to remove any plugs not restrained by the presence of a seedling growing in that specific plug.

The apparatus may also include seedling delivery means arranged to deliver plugs containing seedlings from the conveyor to the seedling planting apparatus.

In one preferred embodiment, the plugs are retained on the conveyor in a substantially horizontal orientation, and the seedling delivery means is arranged to deliver plugs containing seedlings to the seedling planting apparatus in a substantially vertical orientation for planting. The seedling delivery means may include at least one substantially upright discharge tube.

The seedling delivery means may utilize a combination of pneumatic air pressure and gravity to change the orientation of the plugs containing seedlings from the substantially horizontal orientation on the conveyor to the substantially vertical orientation for planting.

In one embodiment, the seedling delivery means includes an air jet or air expander at the open conveyor pocket that pneumatically transfers plugs with seedlings from the conveyor to the seedling planting apparatus.

In one embodiment, the air jet or air expander may be arranged to direct a substantially vertical airflow onto plugs with seedlings in transition from the horizontal orientation to the vertical orientation.

In an alternative embodiment, the air jet or air expander is arranged to direct a substantially horizontal airflow to transfer plugs with seedlings into a transfer tube having a substantially horizontal section and a substantially vertical section joined by a bend section.

The apparatus may further include an electronic or computer controller arranged to synchronise the operation of the plug ejection means, the movement of the conveyor, and the operation of the plug removal means.

BRIEF DESCRIPTION OF THE DRAWINGS

Preferred embodiments of the present invention will now be described, by way of example only, with reference to the accompanying drawings, in which.

DETAILED DESCRIPTION OF THE DRAWINGS

Figure 1:
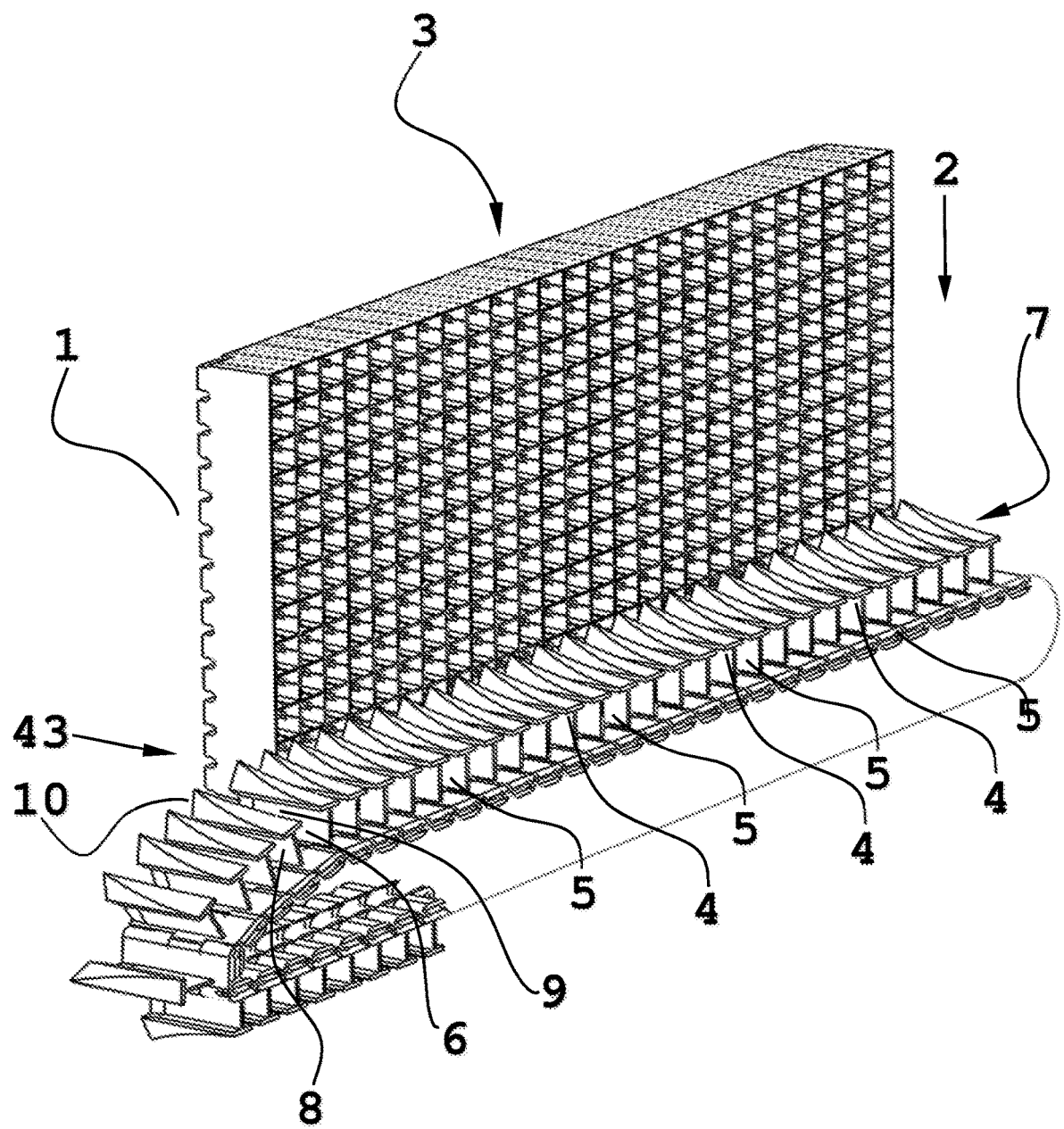
FIG. 1 is a perspective view of a tray including a plurality of cells for holding plugs of growing medium containing seedlings, and a conveyor arranged to receive plugs ejected from the tray and to convey the plugs to a seedling planting apparatus.

FIG. 1 shows a tray 3 and a conveyor 7 of an automatic selective transplanter according to one embodiment of the invention. The tray 3 is substantially as described in our Australian patent application No. 2017265108 A1, the contents of which are incorporated herein by reference. Twin wall gear racks 1, are provide at both ends of the tray 3 which is adapted to be indexed vertically in the direction of Arrow 2 relative to the conveyor. The tray 3 includes a plurality of cells arranged in rows for holding plugs of growing medium containing seedlings. The conveyor 7 has a plurality of cell pockets 5 formed by cleats 4 of the conveyor 7. The arrangement is such that a complete row of plugs can be ejected from cells of the tray 3 by plug ejection means in the direction of Arrow 43, loading of the opposing cell pockets 5 of the conveyor 7. One preferred form of plug ejection means which has pneumatically operated profiled eject pins is described with reference to FIGS. 11 and 14 to 18. The complete transfer of plugs from a row of cells of the tray to the cell pockets 5 of the conveyor 7 may be completed in about a seventy thousandth of a second.

The conveyor 7 preferably comprises a conveyor belt arranged in an endless loop. The conveyor 7 may be arranged to move at discrete steps, preferably of between 10 to 15 cell pockets per second.

At each discrete cell/cleat pocket advancement, a cell pocket containing a plug will arrive at position 6 of the conveyor 7. The cell pocket defined by specific cleats 8 and 9 at position 6 will be partially opened by the angular directional change of the conveyor 7, at position 10. The plug contained within the partially opened cell pocket at position 6 is then loosely retained by the conveyor 7.

Figure 2:
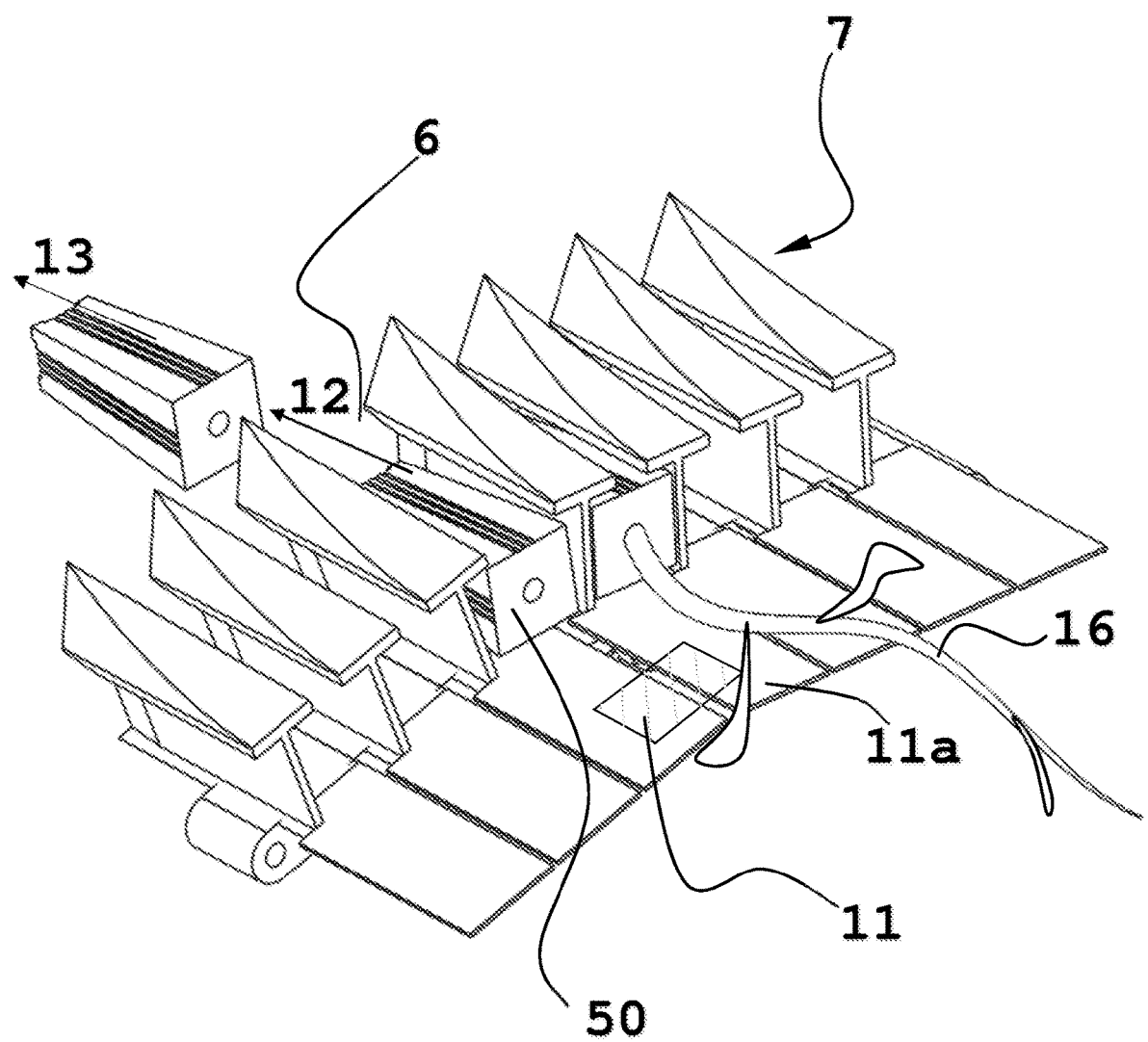
FIG. 2 is a perspective view of part of the conveyor of FIG. 1 showing a cell pocket of the conveyor retaining a plug containing a live seedling with plant material projecting from the plug, and another cell pocket containing a dud plug.

The enlarged view in FIG. 2 shows how a dud plug 50, which does not contain a live seedling, at position 6 is removed from the conveyor 7 so that the dud plug is not transferred to seedling planting apparatus of the transplanter. In one embodiment, the conveyor includes a large soft closed cell foam roller (shown in FIGS. 4 and 5) which is arranged to engage live plant material or foliage 16 projecting from a plug retained within a cell pocket of the conveyor 7 at retention area 11.

If the plug 50, loosely retained in the partially opened cell at position 6, does not have any live plant material or foliage 16 projecting from it to be engaged by the large soft closed cell foam roller adjacent to plug position 6, the plug 50 is removed by a plug removal means. In one embodiment, the plug removal means includes an air jet means disposed adjacent to plug position 6 which is arranged to provide a pulse of air acting in the direction of Arrow 12 to ejects any dud plug 50, from position 6, in the direction of arrow 13. If live plant material or foliage 16 projects from a plug at position 6, the plug is restrained between the soft foam roller (not shown in FIG. 2) and an individual cleat extension 11 (a) of the conveyor 7.

Figure 3:
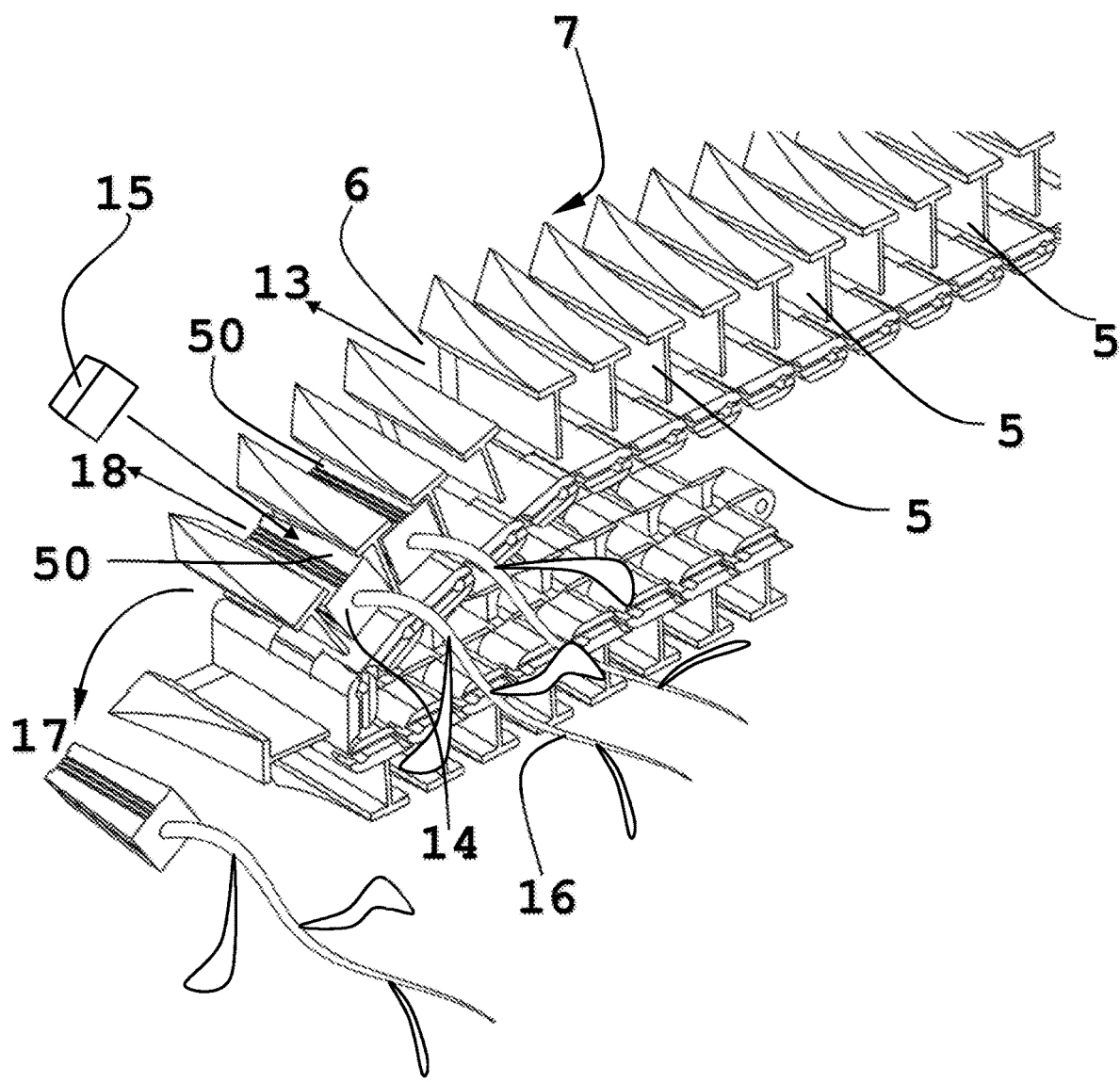
FIG. 3 is another perspective view of part of the conveyor of FIG. 1.

Referring to FIG. 3, cell pockets 5 containing plugs with live plant material continue being advanced past position 6 to a planting hold position 14 at the end of the conveyor 7.

Figure 8:
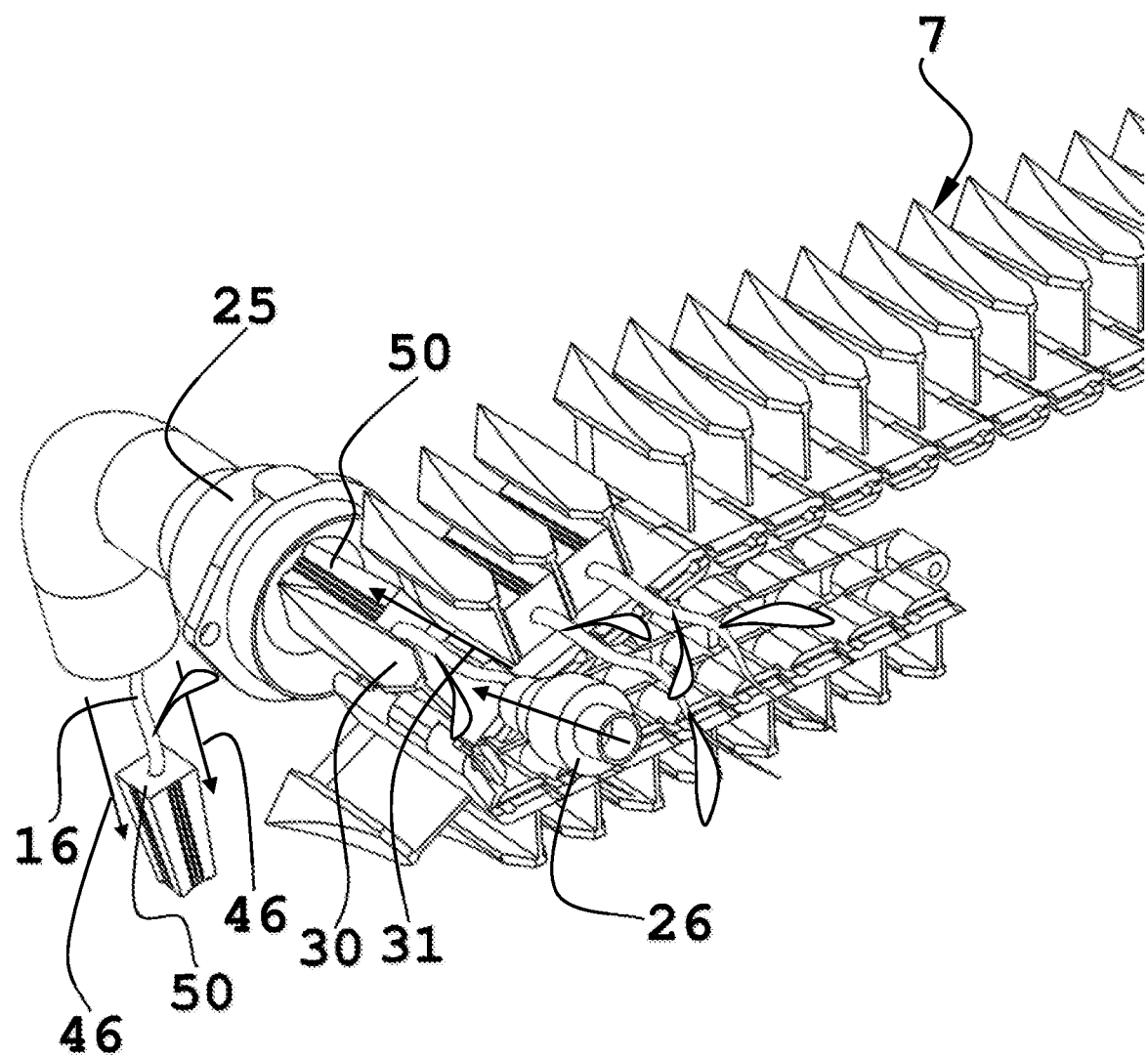
FIG. 8 is a perspective view of an end part of the conveyor showing one embodiment of a seedling delivery arrangement for delivering plugs containing seedlings from the conveyor to a seedling planting apparatus.

The presence or absence of plugs in cell pockets 5, at position 14, may be detected by a sensor 15. If a plug 50, is detected at position 14, it is almost certain that a live seedling 16, is growing in the plug 50. The conveyor 7 remains stationary until a plant signal is received indicating the planting apparatus has travelled the required distance for planting the next seedling in the field. Then the plug 50, at position 14, is discharged in either the longitudinal direction of Arrow 17 or the lateral direction of Arrow 18. Direction 17 is more suitable for long plants, and direction 18. When the plugs are discharged in lateral direction 18, the apparatus may include a pneumatic conveying tube such as shown in FIG. 8.

If there is no plug detected at position 14, because it has been ejected at position 6, in the direction of Arrow 13 then the conveyor belt 7, will be rapidly advanced until a plug 5, is sensed at position sensor 15, and will remain present until the plant signal is received.

Figure 4:
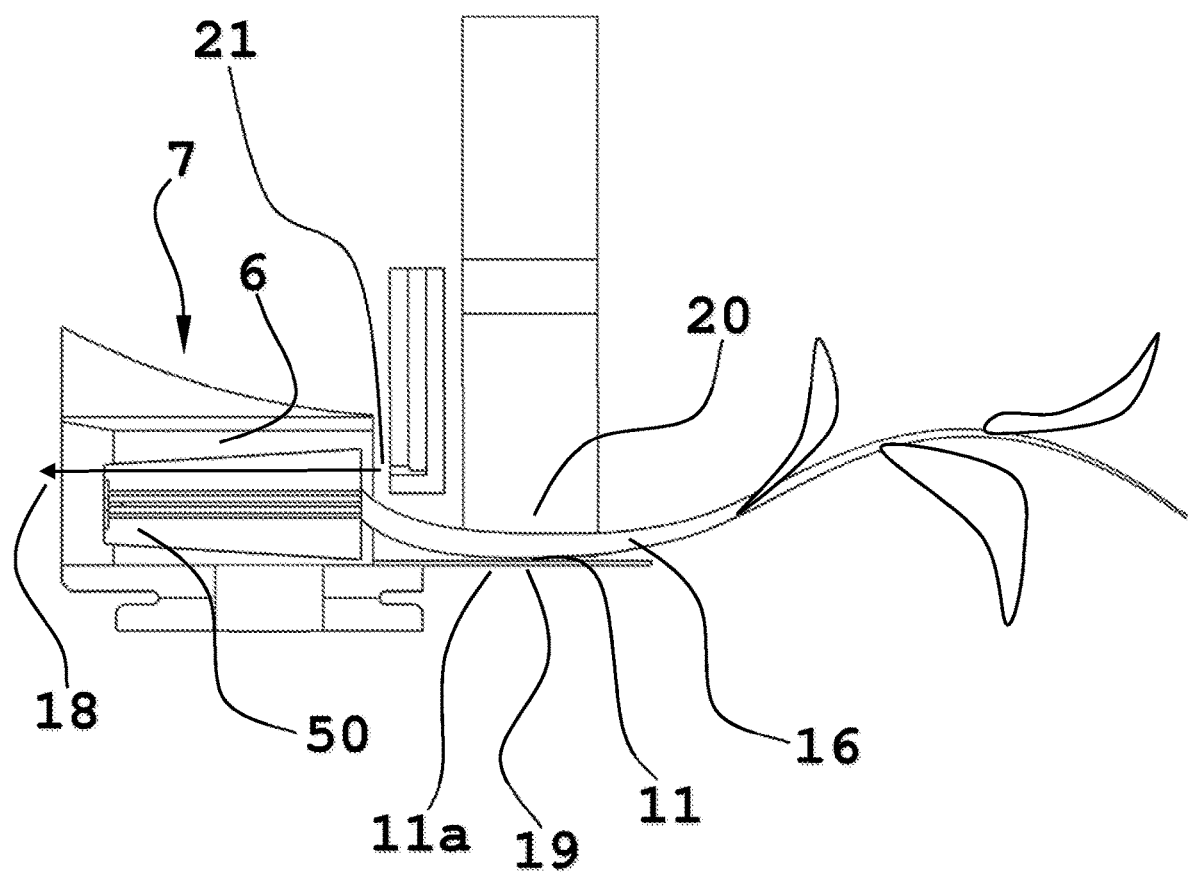
FIG. 4 is a sectional view of part of the conveyor showing a roller for engaging plant material projecting from a cell pocket of the conveyor.

FIG. 4 is a sectional view of the conveyor 7, at position 6, showing a plug 50, with a seedling having projecting plant material 16, entrapped at 19 between a retaining conveyor cleat extension 11(a) at the retention position 11, and the depressed soft roller 20. This restrains the plug 50, at position 6, from being ejected by the air pressure from jet orifice nozzle 21, allowing only dud plugs to be ejected in the direction of Arrow 18. This provides a substantially fool proof means of selectivity and gapping up to provide substantially uniform, evenly spaced plants in the field.

Figure 5:
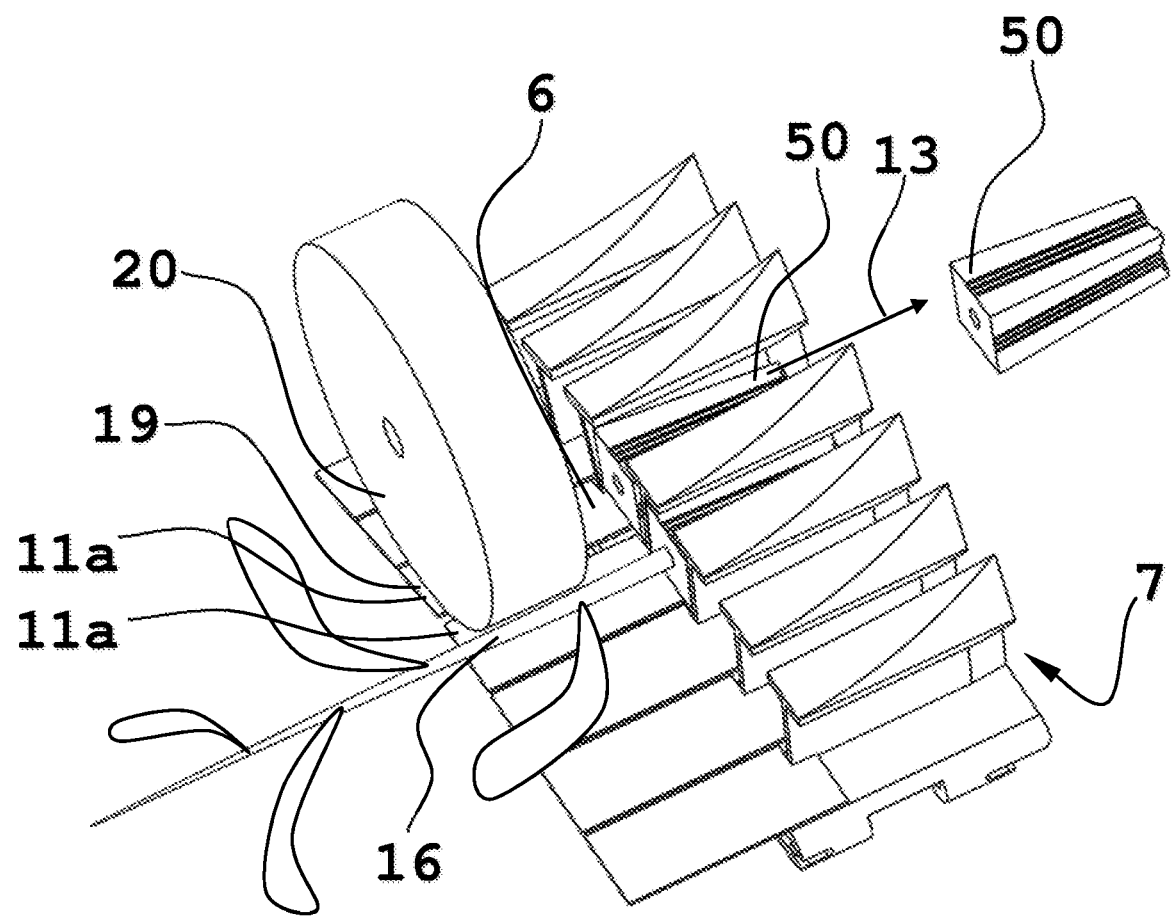
FIG. 5 is a perspective view of the part of the conveyor shown in FIG. 4.

FIG. 5 shows that there is not a seedling 16 present at the conveyor position 6, and there is no live plant material projecting from the plug 50 to be entrapped between the compressed side of the soft roller 20, against the conveyor cleat extension 11(*a*) at 19, the plug 50, which is not restrained, is ejected by a controlled air pressure in the direction of the arrow 13.

Figure 6:
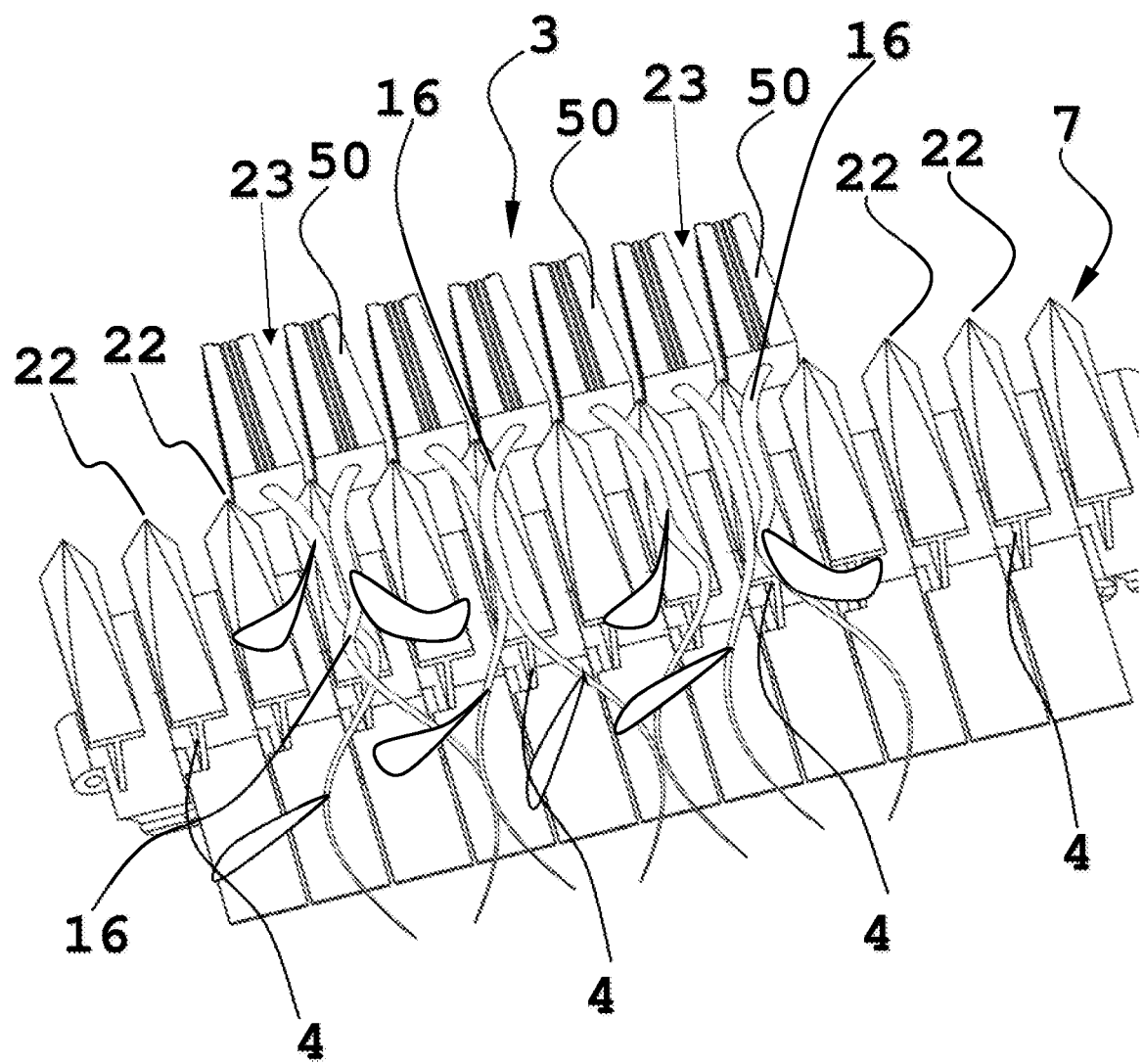
FIG. 6 is a schematic perspective view from above of part of the conveyor with a plurality of plugs prior to ejection of the plugs into cell pockets of the conveyor.

FIG. 6 illustrates that seedling stems 16 projecting from the plugs 50, can overlap and be intertwined causing obstruction during loading from the tray 3, (not shown) into the conveyor 7. The invention provides for the conveyor 7, to travel vertically up and down with the apex 22 of each conveyor cleat 4, remaining parallel and closely aligned with the tray 3, (not shown). Vertical walls separate each cell containing a plug and thereby separate the seedling stems 16, at each of the vertical cell dividers at 23.

Figure 7:
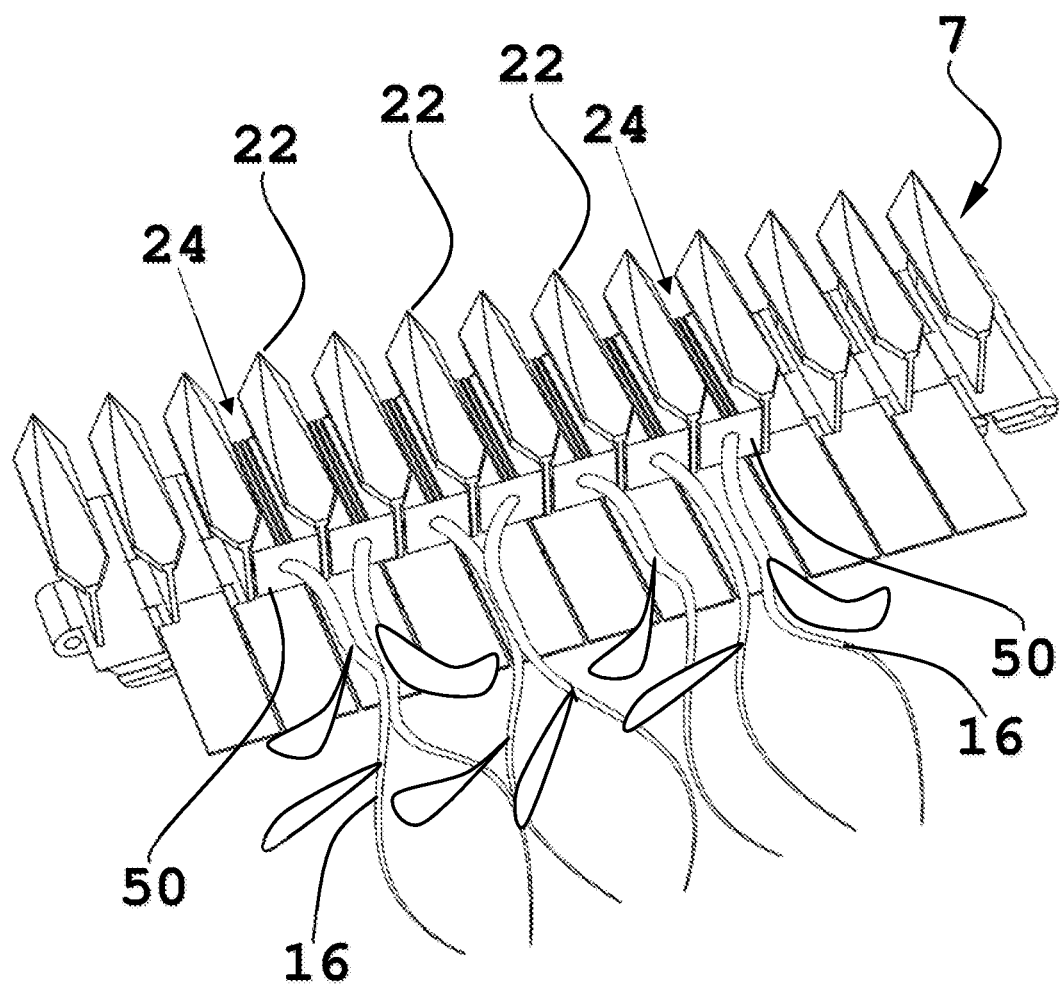
FIG. 7 is a schematic perspective view from above similar to that of FIG. 6 with a plurality of plugs retained within cell pockets of the conveyor.

FIG. 7 illustrates the plugs 50, and seedlings 16, separated by the apexes 22 of the cleats, and transferred in the direction of the arrows 24, from the tray into the cell pockets of the conveyor belt 7.

Referring to FIG. 8, the conveyor 7, is terminated around an adjustable position conveyor nose roller before rotating and returning back to form an endless loop. The position of the internal nose roller (not shown) causes the last vertical cleat 30, to open to allow the selected and retained plug 50, to be held loosely. On receipt of a plant signal, an annular ring air expander 25, is activated and an air jet 26 is activated simultaneously causing the plug 50, and seedling 16, to accelerate rapidly in the direction of the arrow 31. The plug and seedling are pneumatically conveyed from a horizontal orientation to a vertical orientation in the direction of arrows 46, and conveyed pneumatically to a position for planting, thereby allowing close row spacing. An alternating multi position tube transfer (not shown) can effectively have one selective feeder head transposing plugs 50, and seedlings 16, to a number of separate field planting shoes or planting elements allowing very close row to row spacing in the field on a parallel or diamond pattern substantially gap free.

Figure 9:
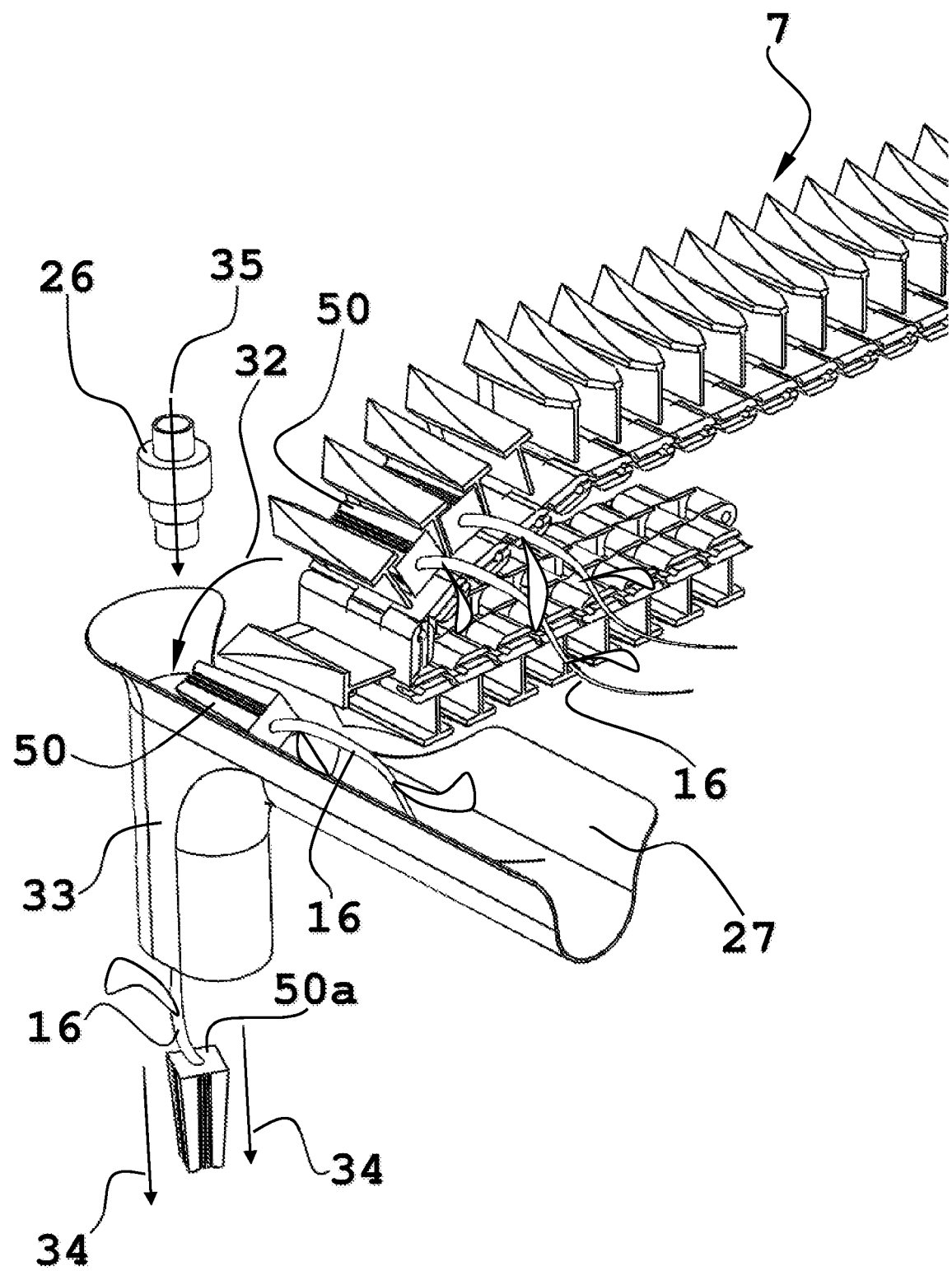
FIG. 9 is a perspective view of an end part of the conveyor showing another embodiment of a seedling delivery arrangement for delivering plugs containing seedlings from the conveyor to a seedling planting apparatus.

FIG. 9 shows an alternative embodiment, particularly suitable for long seedlings, in which a selected and stored plug 50 and seedling 16, on receipt of a plant signal command is thrown into an inclined trough 27, in the direction of arrow 32. The plug 50, is thrown into a position over a vertical planting tube 33 in which is not supported by the trough 27, whereas the seedling 16, is supported by the trough 27. The unsupported plug 50 and seedling then falls in the vertical downward direction in the direction of arrows 34. An air jet or air expander 26, in one preferred embodiment, is positioned vertically above the plant drop tube 33, providing a timed pulsed airflow in the direction of arrow 35, for very high-speed transfer of plug 50 (*a*), and seedling 16, from horizontal orientation to vertical orientation in the direction of arrow's 34.

Figure 10:
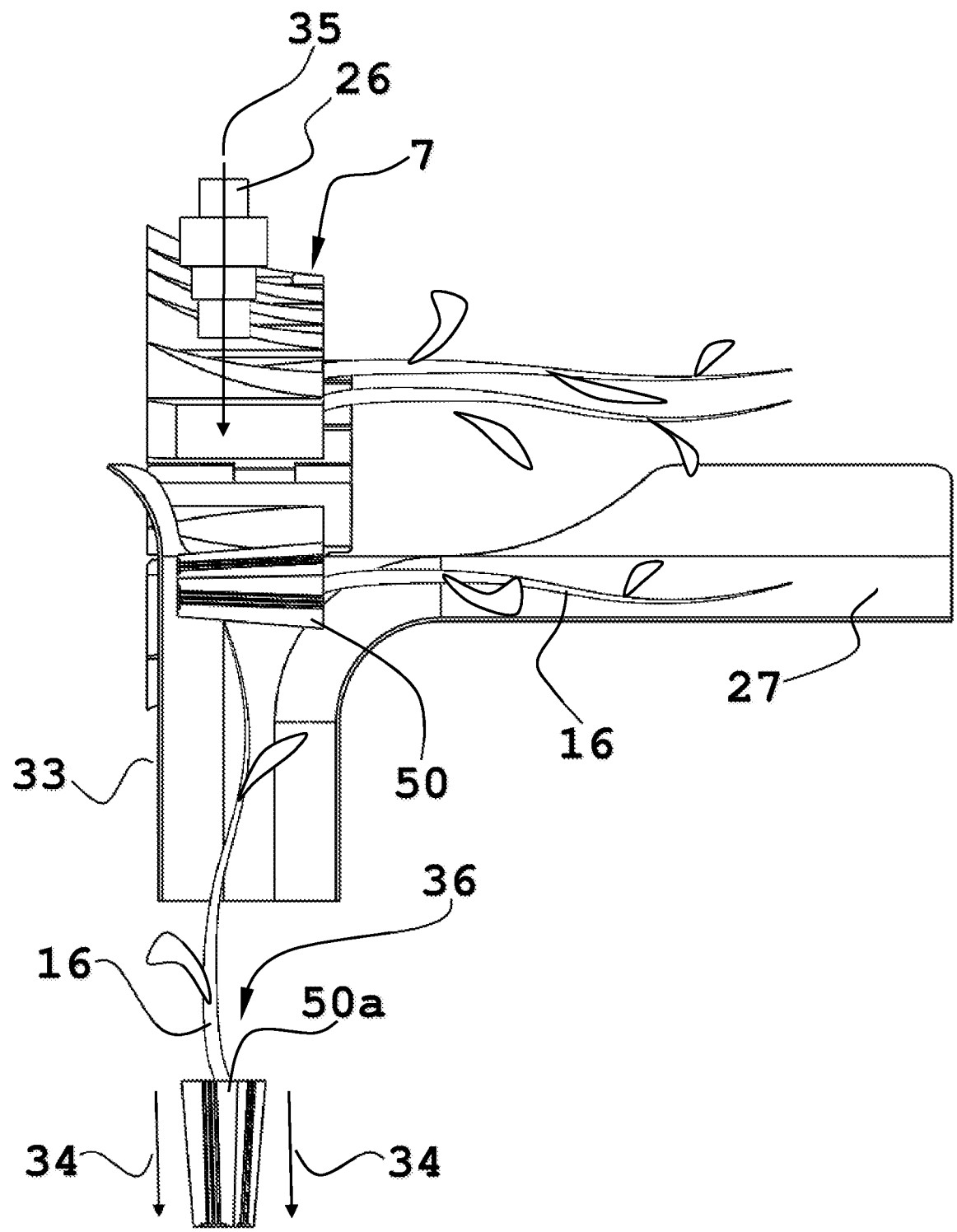
FIG. 10 is a cutaway sectional view of FIG. 9.

FIG. 10 illustrates a cutaway sectioned view showing the plug 50 and seedling 16, being thrown on plant signal command in a horizontal orientation with the seedling 16, being arrested by trough 27, allowing the unrestrained plug 50, being unsupported over the centre of the drop tube 33, to rotate immediately to the vertical position shown at 36, travelling vertically in the direction of arrows 34. The air jet 26, provides a controlled and timed air blast in the direction of arrow 35, to accelerate the plug 50 (*a*), and seedling 16, in the direction of arrows 34, for high speed transplanting without gaps between seedlings in the field.

Figure 11:
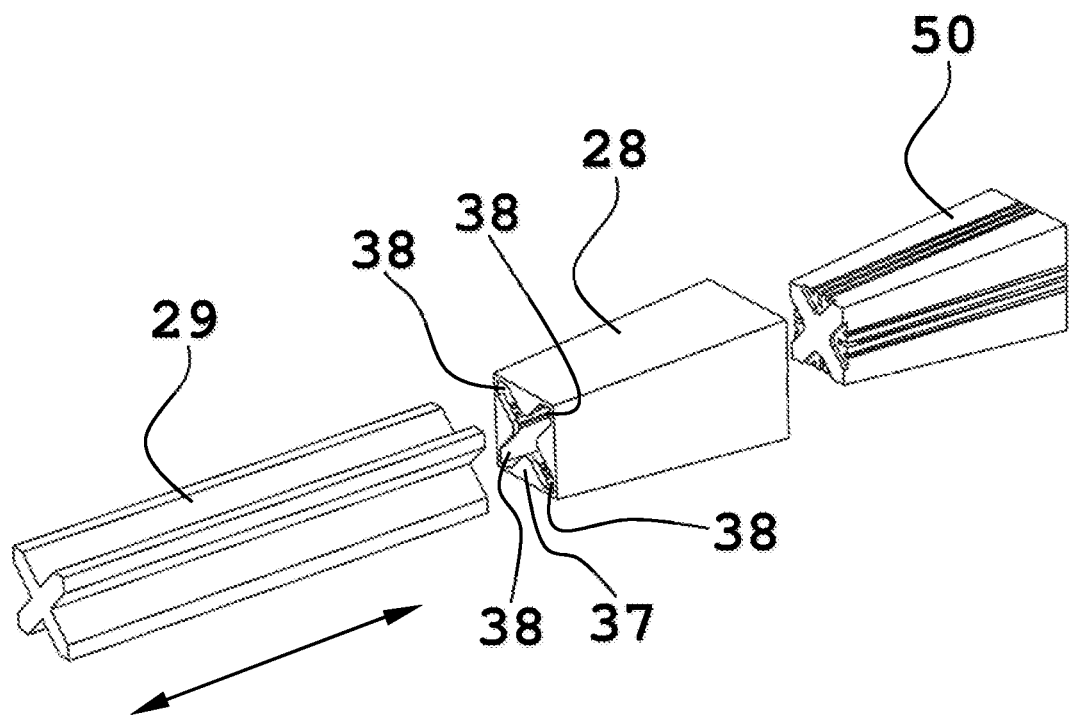
FIG. 11 is a schematic perspective view showing one form of a plug ejection mechanism arranged to eject a plug from a cell of the tray.

FIG. 11 illustrates an eject member 29, which is arranged to eject a plug 50, from a tray cell 28, by travelling through the tray cell 28. The eject member 29 is preferably of cruciform shape, and is shaped to pass through the soil retention tray cell floor 37, via a complementary shaped drainage slots 38, to engage against the plug 50, on the highest concentration of stabilised root mass in the corners of the plug 50.

Figure 12:
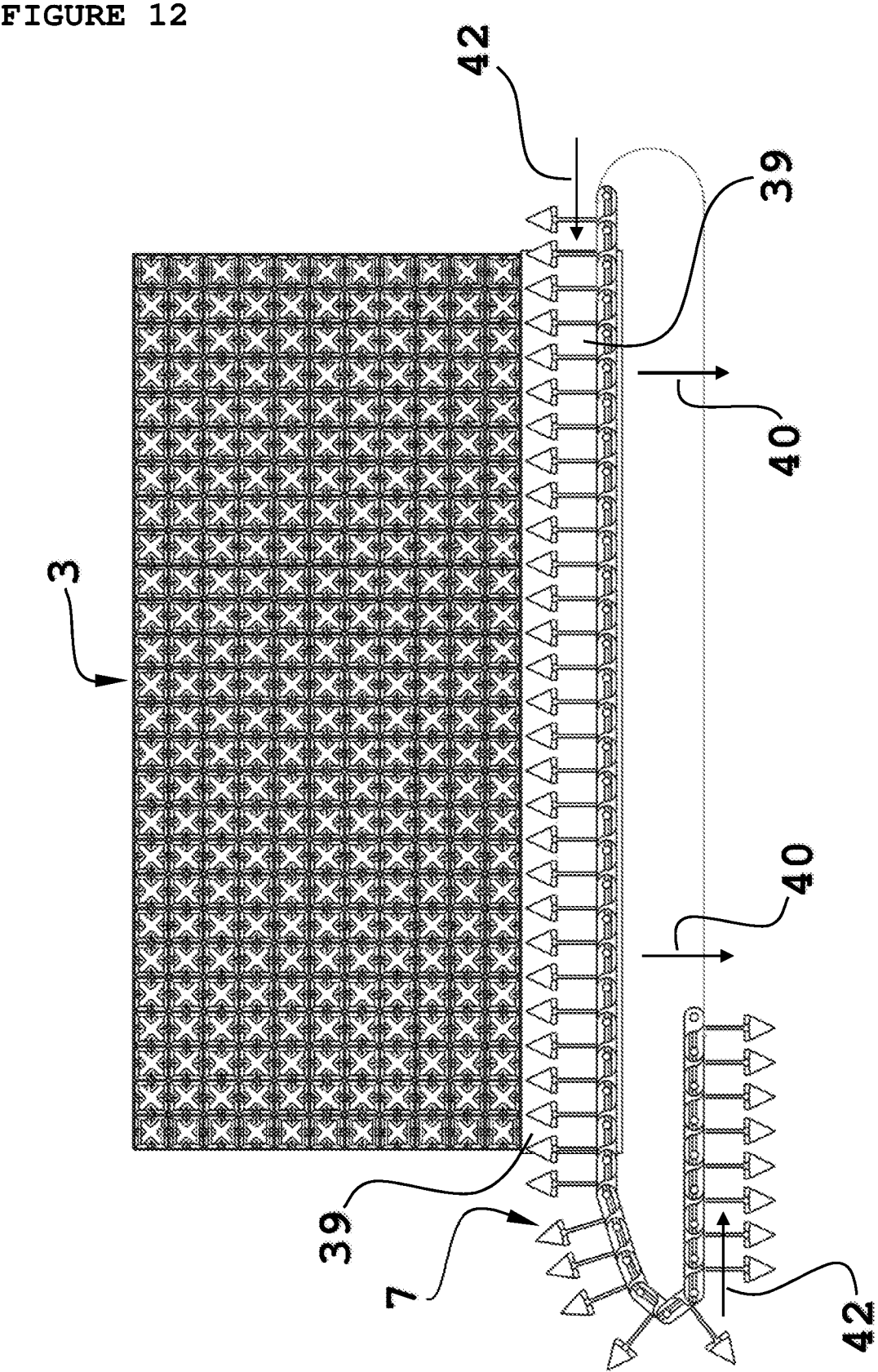
FIG. 12 is an end view of the tray and the conveyor of FIG. 1.

FIG. 12 illustrates the tray 3, in a vertical position adjacent to conveyor 7, which is able to move vertically relative to the conveyor 7 in the direction of arrows 40. The conveyor 7 is able to move incrementally in the direction of arrows 42 in discrete steps exactly the width of each tray cell carrying the plugs. In a preferred embodiment the conveyor 7 can move in discreet steps at 10 to 15 times per second.

Figure 13:
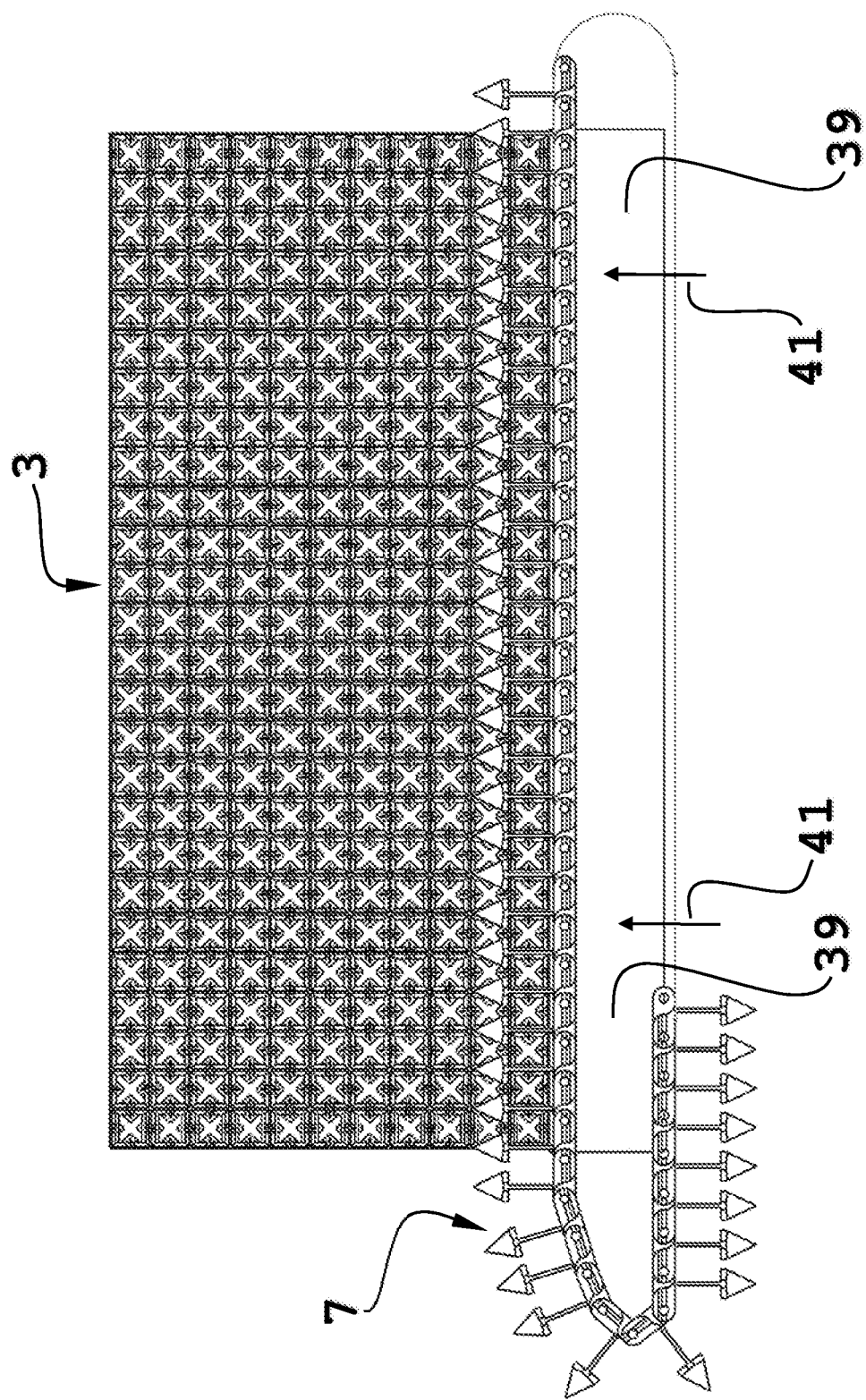
FIG. 13 is an end view similar to FIG. 12 showing the conveyor moved vertically relative to the tray.

FIG. 13 shows the tray 3 in a vertical position with the conveyor 7 being able to travel upwardly relative to the tray 3 and adjacent to the tray in the direction of arrows 41.

Figure 14:
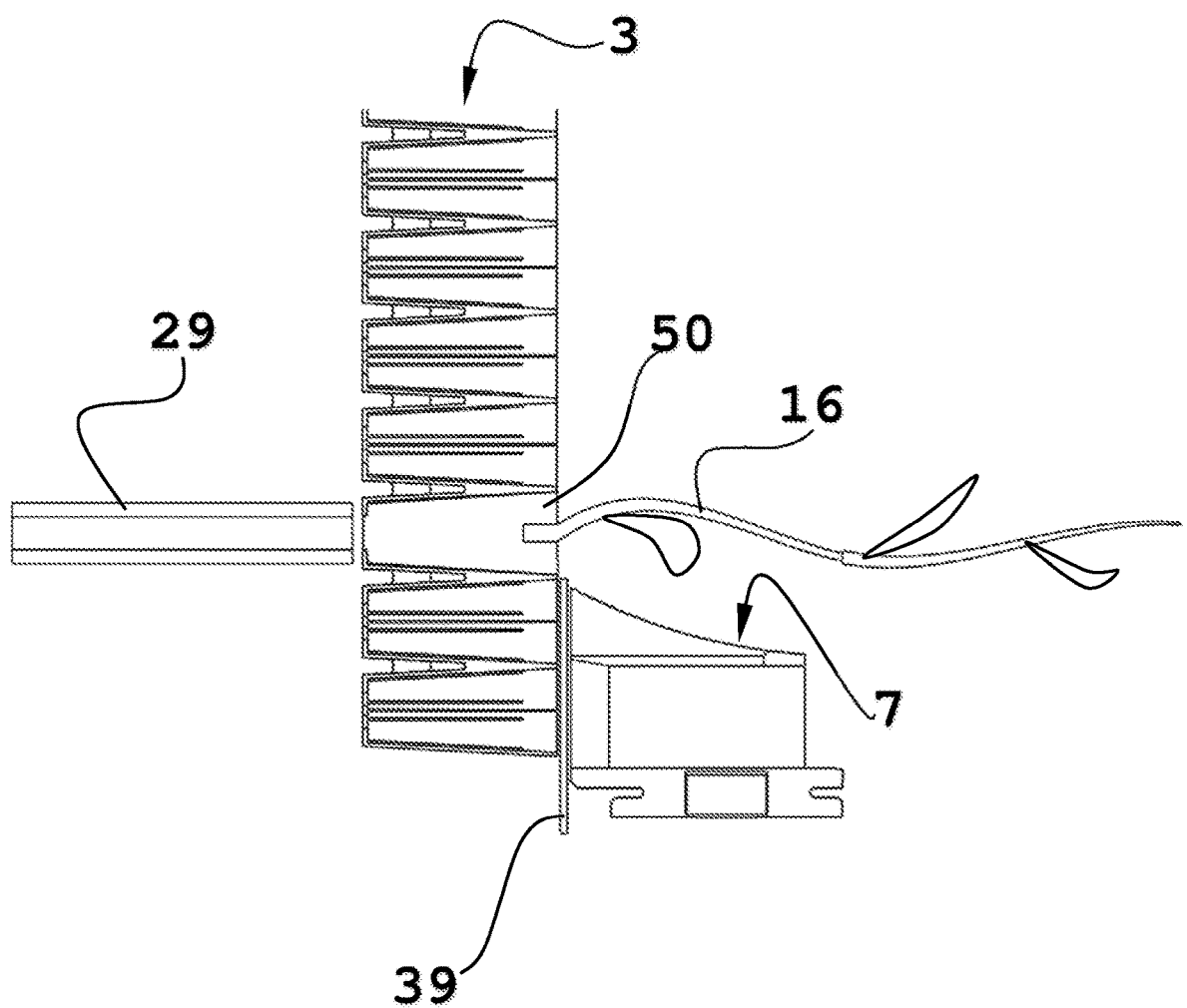
FIG. 14 is a schematic sectional view of the tray and conveyor in the position of FIG. 12.

FIG. 14 illustrates a sectional view of a vertical tray 3, containing a plug 50 within one of the cells of the tray 3, and plant material of a seedling 16 projecting from the plug 50. The cleated conveyor 7, is disposed adjacent the tray 3, being separated in the lower extremities by a stationary separator plate 39. An ejector member in the form of an eject push pin 29, remains clear of tray 3, in a retracted position.

Figure 15:
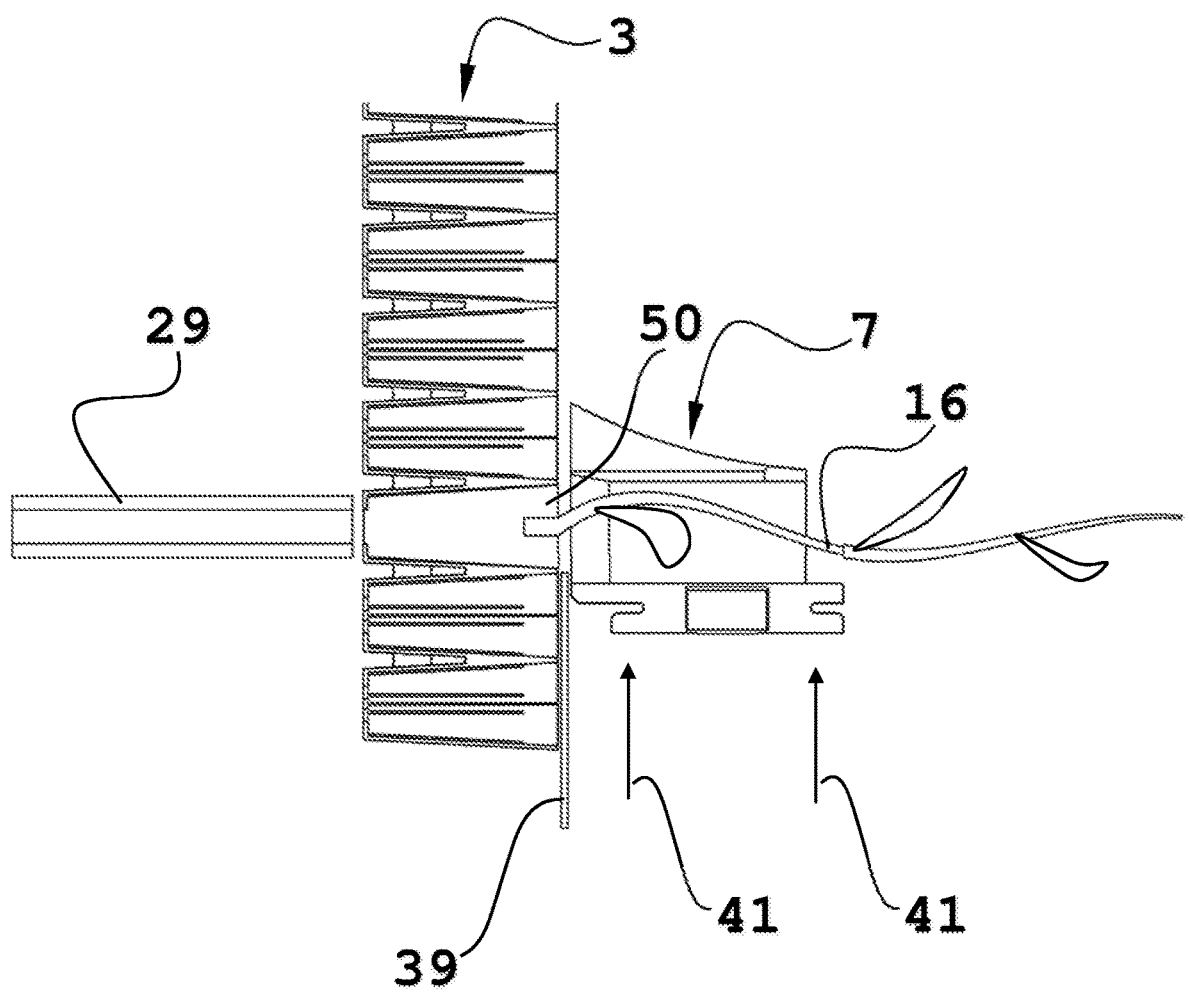
FIG. 15 is a schematic sectional view of the tray and conveyor with the conveyor moved vertically upwards into the position of FIG. 13.

FIG. 15 illustrates a sectional view of the tray 3 indexed vertically downward in discreet accurate steps exactly the distance of the height of each of the cells containing a plug 50, until the plug 50, and seedling 16, are in line with the eject push pin 29. The tray 3 will remain in this position until the conveyor 7 has been reloaded by ejecting plugs 50 from a row of cells of the tray 3 into the cell pockets of the conveyor 7.

The conveyor 7, full of plugs 50, is then moved incrementally so that plugs 50, and seedlings 16, are transferred from the conveyor 7 to the planting apparatus until the conveyor 7 is empty.

The empty conveyor can then be moved into a position exactly in line with another row of tray full of plugs at which time the conveyor reloads with a complete row of plugs 50 and seedlings 16, from the tray 3. The conveyor is rapidly raised vertically in the direction of the arrows 41, until the empty conveyor is exactly in line with the eject pin 29, and clear of the separator and plug retaining stationary plate 39, then reload is initiated.

Figure 16:
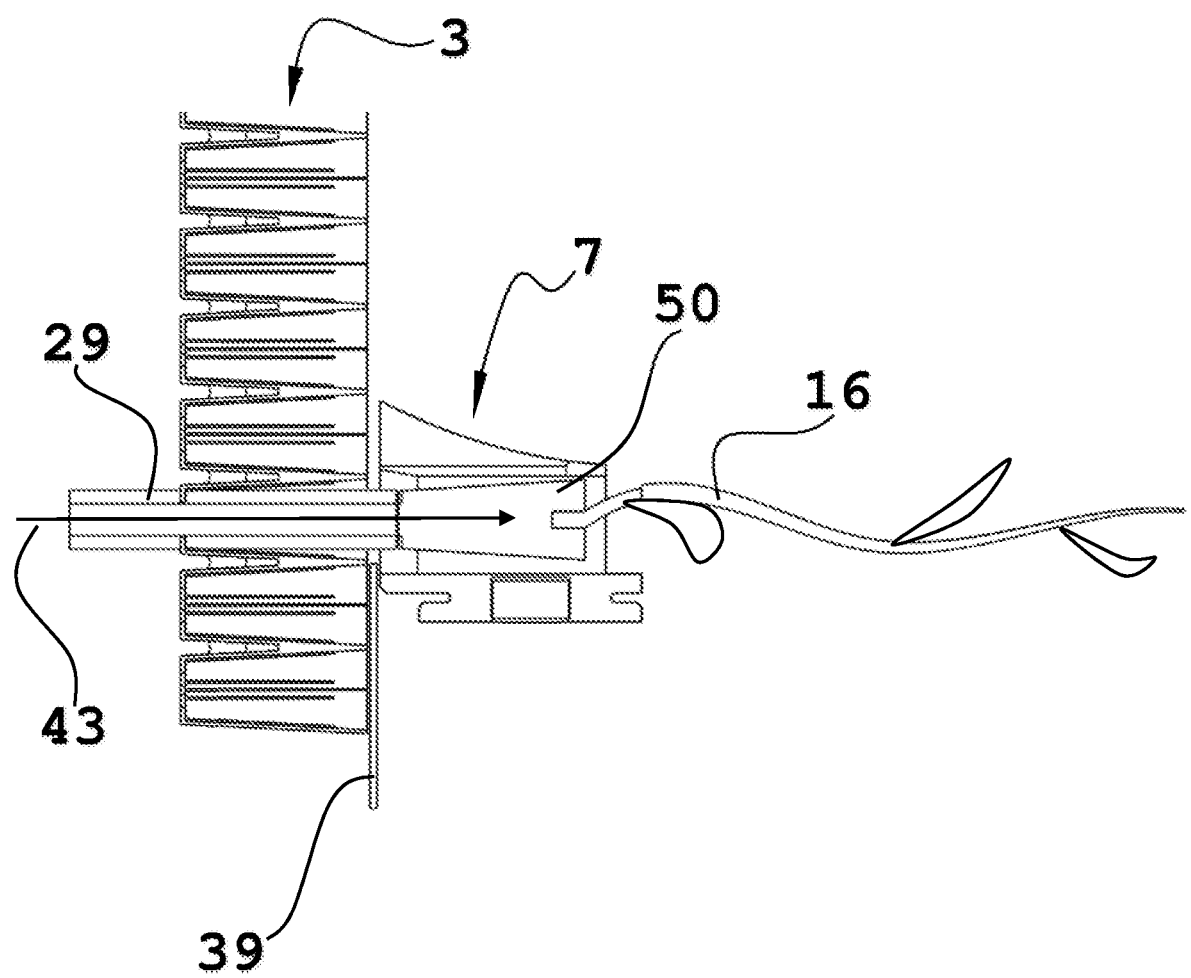
FIG. 16 is a schematic sectional view similar to FIG. 15 showing a plug ejected from a cell of the tray into a cell pocket of the conveyor.

FIG. 16 illustrates a cutaway section of the tray 3 with the conveyor 7 aligned with the eject push pin 29 which moves in the direction of arrow 43 to eject plug 50 into a cell pocket of the conveyor 7. With pneumatic air pressure operating the eject push pin, the plug 50 and seedling 16, can be loaded into the conveyor 7 in about 70 thousandths of a second.

Figure 17:
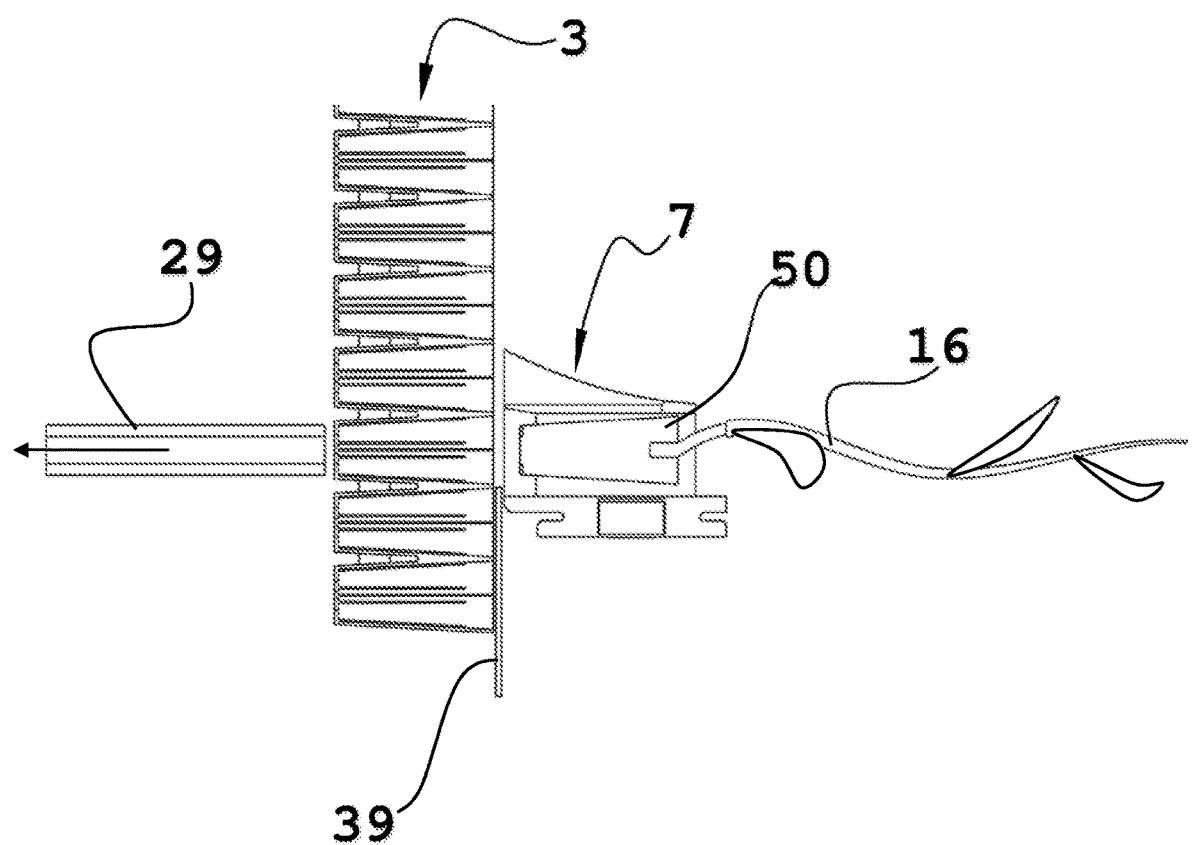
FIG. 17 is a schematic sectional view similar to FIG. 16 showing the plug ejection mechanism in a retracted position after ejection of a plug from a cell of the tray.

FIG. 17 illustrates a sectional view of the tray 3 and the conveyor 7, with the complete length of a row of plugs 50, and seedlings 16, loaded into the conveyor 7, at which time the eject push pins 29, are retracted clear of the conveyor 7 and tray 3.

Figure 18:
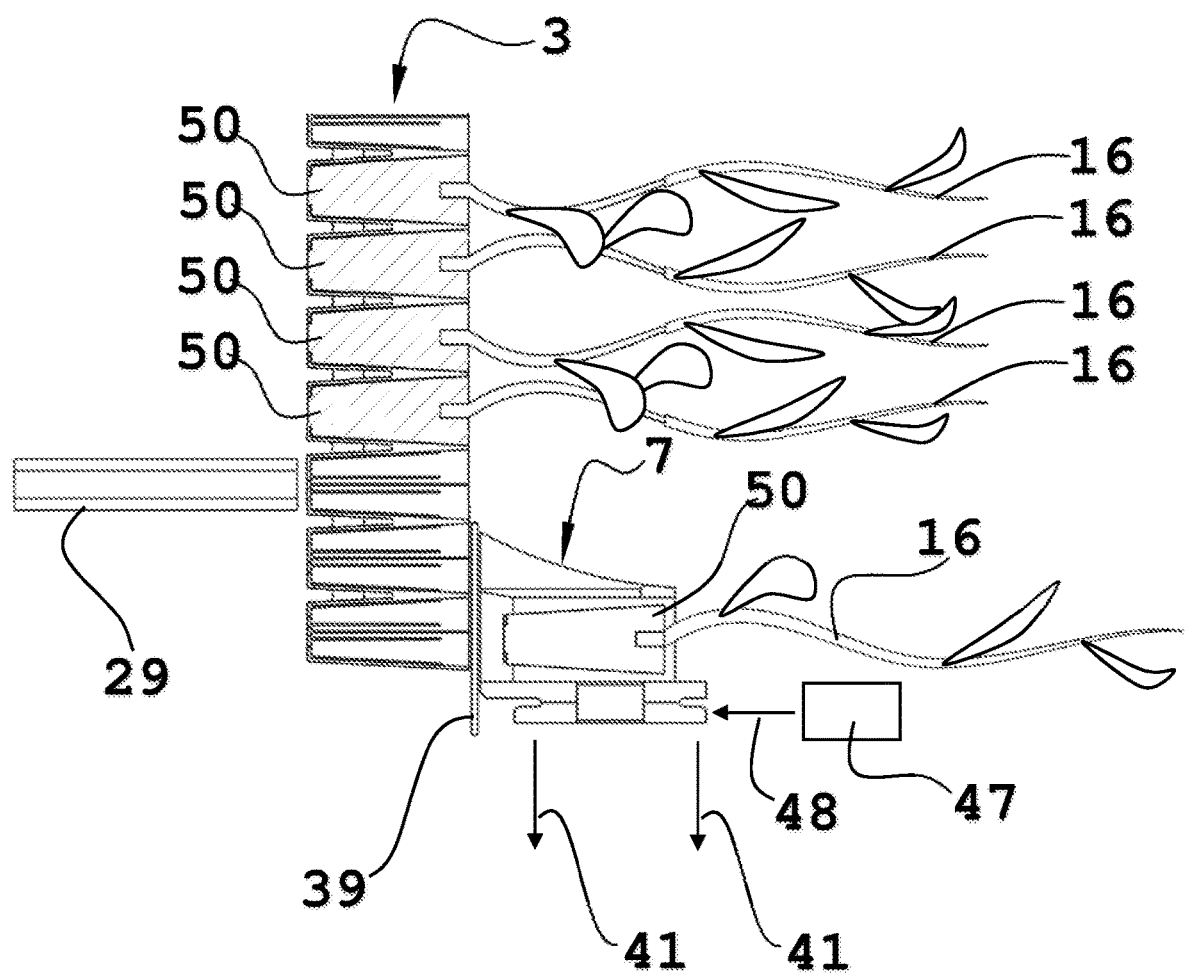
FIG. 18 is a schematic sectional view similar to FIG. 17 showing the conveyor moved vertically downwards relative to the tray.

FIG. 18 illustrates a sectional view of the tray 3 containing a plurality of plugs 50 in vertical rows, and the conveyor 7 in which, immediately after the retracted eject push pins 29 have cleared the conveyor 7, the conveyor 7, descends rapidly vertically downward in the direction of arrows 41. The plug 50 and seedling 16, captured within the conveyor 7, are transferred in the direction of arrows 41, entrapping the plug 50, and seedling 16, with the vertical stationary wall 39, which is positioned between the faces of the tray 3, and the conveyor 7. When the conveyor 7 has descended vertically downwards and is clear of the remaining seedlings 16 projecting from the remaining plugs 50 in the tray 3, a sensor 47, initiates a signal at position arrow 48, allowing the conveyor to resume its incremental movement in discrete steps, preferably at 10 to 15 discrete cell steps per second, provided that a plug 50, and a live seedling 16, are not already selected and stored in the last conveyor position awaiting the planting signal. This provides a simple, fast and accurate means of continuity of selected seedlings and substantially eliminates gaps between seedlings transplanted into the field, even when the conveyor 7 is being reloaded with a row of plugs 50 and seedlings 16 from the tray 3.

Figure 19:
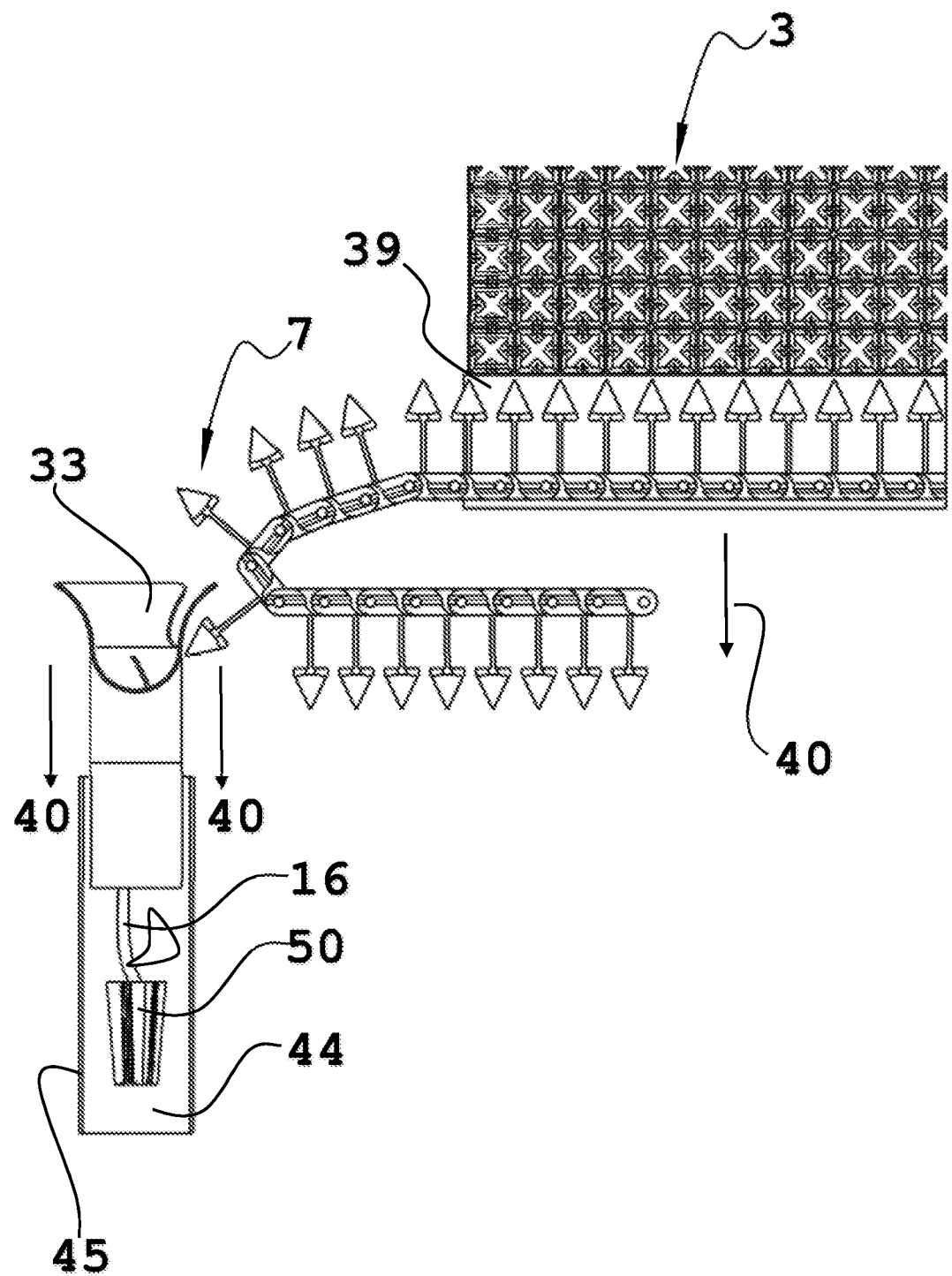
FIG. 19 shows a side view of the tray and conveyor of FIG. 1 and a schematic sectional view through a telescopic planting tube assembly.

FIG. 19 shows a side elevation view of the tray 3 conveyor 7, and a sectional view of a telescopic planting tube assembly 33 and 45. The conveyor 7, after reloading, immediately rapidly descends vertically in the direction of arrows 40. the conveyor 7 moves simultaneously with the upper part 33 of the planting tube assembly also moving in the direction of arrows 40 internally in the lower stationary part 45 of the planting tube assembly in a telescopic action. The plug 50 and seedling 16, are contained in the planting tube assembly 33,45 and have a fast, free passage through both the movable upper part 33 of the plant tube. and the fixed lower part 45 of the plant tube, in the direction of arrows 40.

Figure 20:
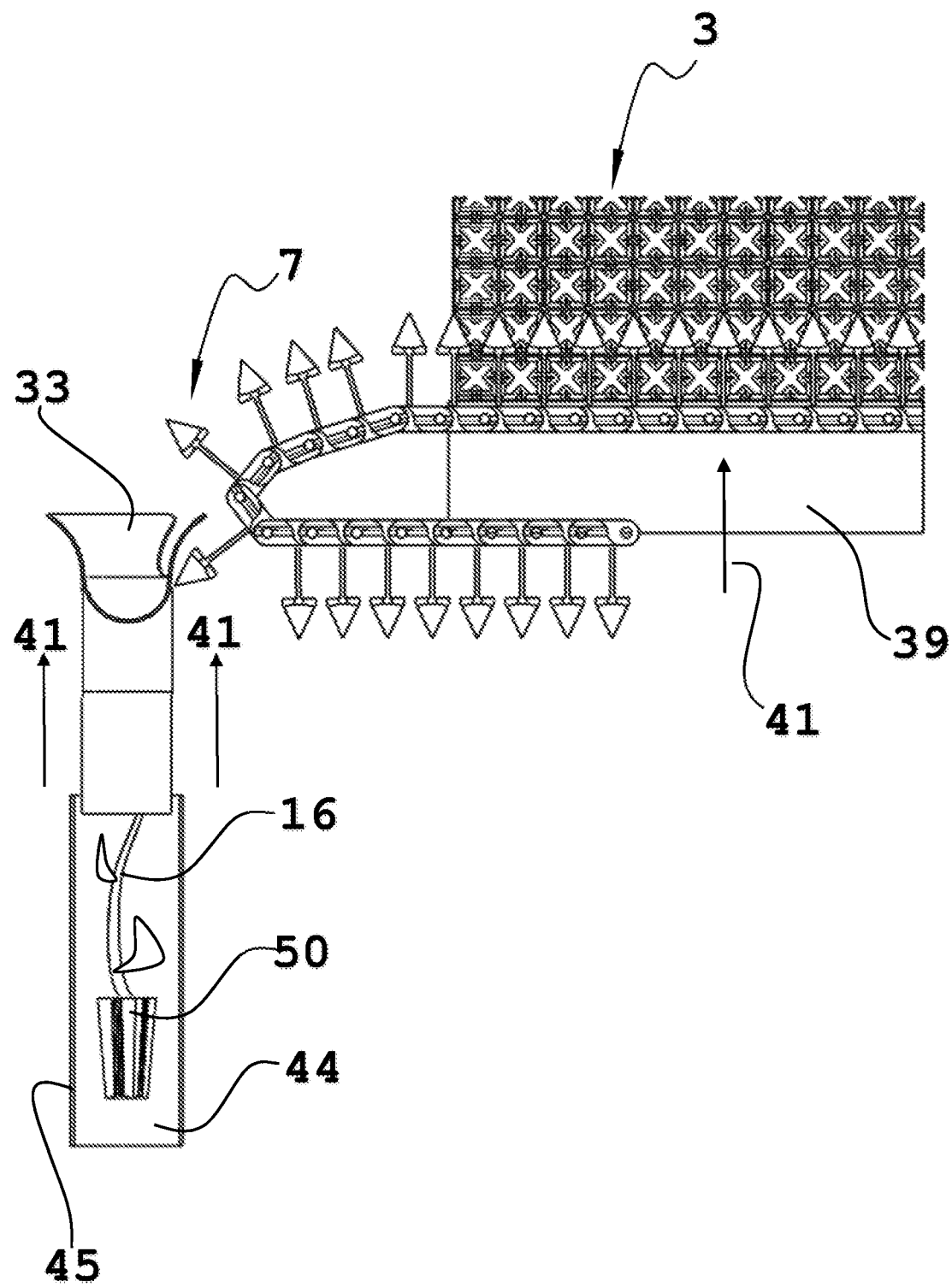
FIG. 20 is a view similar to FIG. 19 showing part of the telescopic planting tube assembly and the conveyor mover vertically upwards.

FIG. 20 illustrates that while the plug 50, and seedling 16, are descending very rapidly through the lower part 44 of the telescopic planting assembly, the upper part 33 of the planting assembly 33, and the conveyor 7, can simultaneously move in unison at a very fast speed in the direction of arrows 41, to allow the cell pockets defined by the cleats on the conveyor 7 to receive a complete row of plugs and seedlings to reload the conveyor 7, whilst maintaining high speed selective transplanting. This is achieved by means of the sensor 47, in FIG. 18 ensuring the cleats on conveyor 7, have moved down sufficiently to clear the next row of seedlings 16 in tray 3, and thereby enable continuous selective gapping up while in the process of vertically moving and reloading the conveyor with seedlings.

It will be appreciated that various modifications may be made to the embodiments described above without departing from the scope and spirit of the invention.

The invention claimed is:

1. Apparatus for transplanting seedlings from a tray into a ground planting position, wherein the tray includes a plurality of cells for holding plugs of growing medium containing seedlings, the apparatus including:
    a plug ejection means arranged to eject plugs from the cells of the tray;
    a conveyor arranged to receive plugs ejected from the tray and to convey the plugs to a seedling planting apparatus;
    a plug removal means arranged to remove plugs that do not contain germinated seedlings from the conveyor at a removal position before they are transferred to the seedling planting apparatus;
    wherein the apparatus includes seedling retention means arranged to engage with plant material of the seedlings projecting from the plugs at said removal position before the plugs are transferred to the seedling planting apparatus, thereby preventing removal of plugs containing seedlings with projecting plant material by the plug removal means,
    wherein the conveyor has a plurality of cell pockets for receiving plugs ejected from the tray,
    wherein the conveyor includes cell pocket opening means arranged to open a cell pocket partially when said cell pocket reaches the removal position, and
    wherein, after removal of plugs without seedlings, the cell pockets close to retain the plugs containing seedlings with projecting plant material, and the cell pockets are advanced by movement of the conveyor to a pre-planting hold position before the plugs containing seedlings are transferred to the seedling planting apparatus.

2. Apparatus according to claim 1, wherein the seedling retention means comprises a flexible roller which includes a resilient surface to engage with the plant material of seedlings on the conveyor at the removal position.

3. Apparatus according to claim 1, wherein an angular change in the direction of movement of the conveyor at the removal position causes the cell pocket to open partially when said cell pocket reaches the removal position.

4. Apparatus according to claim 3, wherein the angular change in direction is between 10 and 25 degrees.

5. Apparatus according to claim 3, wherein the conveyor includes at least one extension portion adjacent a respective cell pocket arranged to support plant material projecting from a plug containing a live seedling, and wherein plant material projecting from a plug containing a live seeding is trapped between the retention means and at least one extension portion of the conveyor at said removal position.

6. Apparatus according to claim 3 wherein the conveyor is arranged to move at discrete steps of between 10 to 15 cell pockets per second.

7. Apparatus according to claim 1, further including at least one sensor to detect the presence or absence of a plug at the pre-planting hold position.

8. Apparatus according to claim 1, wherein the conveyor includes an adjustable position nose roller arranged to open the cell pockets that are at least partially opened at an end position of the conveyor after the pre-planting hold position to enable the plugs containing seedlings to be transferred to the seedling planting apparatus.

9. Apparatus according to claim 1 wherein the conveyor comprises a conveyor belt arranged in an endless loop.

10. Apparatus according to claim 1 further including an electronic or computer controller arranged to synchronise the operation of the plug ejection means, the movement of the conveyor, and the operation of the plug removal means.

11. Apparatus for transplanting seedlings from a tray into a ground planting position, wherein the tray includes a plurality of cells for holding plugs of soil containing seedlings, the apparatus including:
    a plug ejection means arranged to eject plugs from the cells of the tray;
    a conveyor arranged to receive plugs ejected from the tray and to convey the plugs to a seedling planting apparatus;
    a plug removal means arranged to remove plugs that do not contain seedlings from the conveyor at a plug removal position before the plugs are transferred to the seedling planting apparatus; and
    at least one sensor to detect the presence or absence of a plug at a pre-planting hold position after the plug removal position and before the plugs are transferred to the seedling planting apparatus.

12. Apparatus according to claim 11 wherein movement of the conveyor is stopped to hold a plug containing a seedling at the hold position until a plant signal is received from the seedling planting apparatus.

13. Apparatus according to claim 11 wherein the plug removal means includes an air jet arranged to direct a jet of air onto each plug at the plug removal position before plugs are transferred to the seedling planting apparatus so that plugs that are not restrained by engagement of the retention means with projecting plant material are removed.

14. Apparatus for transplanting seedlings from a tray into a ground planting position, wherein the tray includes a plurality of cells for holding plugs of soil containing seedlings, the apparatus including:
- a plug ejection means arranged to eject plugs from the cells of the tray;
- a conveyor arranged to receive plugs ejected from the tray and to convey the plugs to a seedling planting apparatus;
- a plug removal means arranged to remove plugs that do not contain seedlings from the conveyor at a position before they are transferred to the seedling planting apparatus;
- wherein the plug removal means includes means arranged to direct a jet of air onto each plug at said position, and the apparatus further including retention means arranged to engage with and restrain plant material projecting from plugs at said position, so that plugs that are not restrained by the retention means are removed by the jet of air.

15. Apparatus according to claim 14, further including seedling delivery means arranged to deliver plugs containing seedlings to the seedling planting apparatus.

16. Apparatus according to claim 15, wherein plugs are retained on the conveyor in a substantially horizontal orientation, and the seedling delivery means includes at least one substantially upright discharge tube so that plugs containing seedlings are delivered to the seedling planting apparatus in a substantially vertical orientation for planting.

17. Apparatus according to claim 16, wherein the seedling delivery means utilizes a combination of pneumatic air pressure and gravity to change the orientation of the plugs containing seedlings from the substantially horizontal orientation on the conveyor to the substantially vertical orientation for planting.

18. Apparatus according to claim 17, wherein the seedling delivery means includes an air jet or air expander at an open conveyor pocket that pneumatically transfers plugs with seedlings from the conveyor to the seedling planting apparatus.

19. Apparatus according to claim 18, wherein the seedling delivery means includes a transfer tube having a substantially horizontal section and a substantially vertical section joined by a bend section, and wherein the air jet or air expander is arranged to direct a substantially horizontal airflow to transfer plugs with seedlings into a transfer tube and is arranged to direct a substantially vertical airflow onto plugs with seedlings in transition from the horizontal orientation to the vertical orientation.

20. Apparatus for transplanting seedlings from a tray into a ground planting position, wherein the tray includes a plurality of cells for holding plugs of growing medium containing seedlings, the apparatus including:
- a plug ejection means arranged to eject plugs from the cells of the tray;
- a conveyor arranged to receive plugs ejected from the tray and to convey the plugs to a seedling planting apparatus;
- a plug removal means arranged to remove plugs that do not contain germinated seedlings from the conveyor at a removal position before they are transferred to the seedling planting apparatus;
- wherein the apparatus includes seedling retention means arranged to engage with plant material of the seedlings projecting from the plugs at said removal position before the plugs are transferred to the seedling planting apparatus, thereby preventing removal of plugs containing seedlings with projecting plant material by the plug removal means, and
- wherein the seedling retention means comprises a flexible roller which includes a resilient surface to engage with the plant material of seedlings on the conveyor at the removal position.

21. Apparatus for transplanting seedlings from a tray into a ground planting position, wherein the tray includes a plurality of cells for holding plugs of growing medium containing seedlings, the apparatus including:
- a plug ejection means arranged to eject plugs from the cells of the tray;
- a conveyor arranged to receive plugs ejected from the tray and to convey the plugs to a seedling planting apparatus;
- a plug removal means arranged to remove plugs that do not contain germinated seedlings from the conveyor at a removal position before they are transferred to the seedling planting apparatus;
- wherein the apparatus includes seedling retention means arranged to engage with plant material of the seedlings projecting from the plugs at said removal position before the plugs are transferred to the seedling planting apparatus, thereby preventing removal of plugs containing seedlings with projecting plant material by the plug removal means,
- wherein the conveyor has a plurality of cell pockets for receiving plugs ejected from the tray, and an angular change in the direction of movement of the conveyor at the removal position causes the cell pocket to open partially when said cell pocket reaches the removal position.

22. Apparatus according to claim 21, wherein the angular change in direction is between 10 and 25 degrees.

23. Apparatus according to claim 21, wherein the conveyor includes at least one extension portion adjacent a respective cell pocket arranged to support plant material projecting from a plug containing a live seedling, and wherein plant material projecting from a plug containing a live seeding is trapped between the retention means and at least one extension portion of the conveyor at said removal position.

* * * * *